3,756,992
POLYURETHANE POLYELECTROLYTES AND
PROCESS FOR PREPARING SAME
Dieter Dieterich, Leverkusen, Germany, assignor to Bayer Aktiengesellschaft, Leverkusen, Germany
No Drawing. Continuation of abandoned application Ser. No. 809,987, Mar. 24, 1969. This application Mar. 13, 1972, Ser. No. 234,315
Claims priority, application Germany, Mar. 27, 1968, P 17 70 068.4
Int. Cl. C08g 22/04
U.S. Cl. 260—77.5 Q          16 Claims

ABSTRACT OF THE DISCLOSURE

Polyurethanes are prepared by dispersing solid or liquid polyurethane polyelectrolytes containing methylol groups by mixing with water, subjecting the electrolytes to a heat treatment of 25 to 200° C. and removing the water.

This is a continuation of application Ser. No. 809,987, filed Mar. 24, 1969, and now abandoned.

This invention relates to polyurethane plastics and a method of production. More particularly, it relates to an improved process for preparing new aqueous polyurethane dispersions.

Numerous processes are already known for the preparation of polyurethane resins from aqueous polyurethane dispersions.

For example, prepolymers with terminal reactive isocyanate groups obtained by reacting compounds which have active hydrogen atoms with a stoichiometric excess of diisocyanates may be dissolved in an organic solvent and emulsified with the aid of emulsifiers under the action of powerful shearing forces in water or in solutions of diamines in water (German Auslegeschrift No. 1,097,678) (U.S. 2,968,575, Mallonee). In this process, an emulsion of the reactive prepolymer is first produced. A chain lengthening reaction then takes place as a result of the diffusion of water or diamine into the droplets of the emulsion and reaction with the isocyanate groups occurs so that, finally, dispersed particles of polymeric polyurethane-ureas are formed. This process has the disadvantage that it is difficult to influence and control the chain lengthening reaction because it takes place in the droplets of emulsion and, as is well known, the chain lengthening reaction of polyisocyanates with water or diamines proceeds with considerable chain branching. In addition, the dispersions obtained are not stable for any length of time.

These disadvantages can be partly avoided by a continuous method of preparation in which the emulsification of the prepolymer is carried out at a low temperature and the diamine is added subsequently. Even by this variation of the process, however, relatively coarse dispersions which tend to sediment out or coagulate are obtained, and the resulting coatings, films and impregnations have very little resistance to water. It has not so far been possible to produce, by such a process, latices with particles below 400 mµ which would dry at room temperature or, at least, at temperatures below 80° C. to form coatings with satisfactory properties rendering them useful. In addition, coarsely disperse, sedimenting but redispersible dispersions cannot be produced by this process.

Furthermore, numerous processes are known for producing emulsifier-free polyurethane dispersions by incorporating cationic or anionic salt groups into the polyurethane polymer chains and mixing solutions of such polyurethanes in organic solvents with water. Stable aqueous polyurethane dispersions are obtained after removal of the organic solvent by distillation.

It has also been proposed to disperse such ionic polyurethanes in water without the use of solvents. Thus for example an ionic polypropylene glycol polyurethane which has been modified with isocyanate groups in the terminal positions can be injected in the form of a hot liquid into water or distributed in water by means of mechanical stirrers which produce high shearing forces. Dispersions of high molecular weight polyurethanes can also be obtained in this way by reacting the emulsion droplets with the water.

This procedure is, however, technically complicated and difficult to reproduce. Furthermore, it is in practice limited to polyether polyurethanes of low viscosity.

It is also known that polyurethanes which are dispersed or dissolved in water may be cross-linked by means of formaldehyde (German Pat. No. 1,187,012). In such a case, formaldehyde, compounds which give off formaldehyde or compounds which react like formaldehyde, are added to the polyurethane dispersion in the course of its preparation and then react with the polyurethane in a cross-linking reaction during the subsequent drying. The addition of aqueous solutions of formaldehyde during the synthesis of the polyurethane mass in the presence of free NCO groups is, of course, out of the question, since the water would immediately react with the free NCO groups, which would lead to the formation of a gelled mass.

It may, therefore, be said that polyurethane dispersions having good technological properties could hitherto only be produced, in practice, by using organic solvents. If one wishes to emulsify prepolymers containing free NCO groups with the use of emulsifiers it is advantageous to use hydrocarbons which are left in the latex. In the case of dispersions of polyurethane polyelectrolytes, the low boiling solvent used for the preparation of the dispersion is removed from the dispersion by distillation and returned to the cycle. Although the dispersions are completely free from organic solvents when applied, this method of preparation is economically less satisfactory.

It is therefore an object of this invention to provide improved polyurethane polymers. It is another object to provide improved polyurethane dispersions. It is another object to provide aqueous polyurethane dispersions without the necessity of using solvents. It is still another object of this invention to provide polyurethane polymers from dispersions that are useful in all types of applications.

The foregoing objects and others which will become apparent from the following description are accomplished in accordance with this invention, generally speaking, by providing polyurethanes by dispersing methylol-containing, solid or liquid, relatively low molecular weight polyurethane polyelectrolytes in water and then effecting further chain lengthening. This can be done by heat treatment, before and/or during and/or after removal of the water via methylene bridges. According to a particular embodiment of the process, the polyurethanes to be dispersed contain reactive terminal groups which are particularly reactive with formaldehyde. These groups are reacted with formaldehyde in the presence of water during or immediately before dispersion. According to another embodiment of the process, the polyurethanes which are to be dispersed are reacted, e.g., via isocyanate groups, with compounds which contain reactive methylol groups, so that polyurethanes with terminal free methylol groups are formed. Contrary to expectations, premature cross-linking does not occur; on the contrary, the process of dispersion is considerably facilitated by the addition of formaldehyde and the terminal methylol groups. Chain lengthening to produce the high molecular weight polyurethane thus takes place during and after the dispersion.

A person skilled in the art would not have expected that the preparation of aqueous polyurethane dispersions, in other words a colloidal two-phase system would be possible according to the invention without the aid of (1) emulsifiers, (2) dispersing apparatuses such as high speed stirrers or other apparatuses which produce shearing forces, (3) solvents, since, according to the state of the art, at least one of these aids is necessary, and that one can obtain, e.g., hydrophobic coatings from the resulting dispersions.

This invention thus relates to a process for the preparation of polyurethanes which is characterized in that solid or liquid polyurethane polyelectrolytes which contain methylol groups are dispersed by mixing them with water, and the dispersed poyurethane polyelectrolytes are subjected to heat treatment at 25 to 200° C. before and/or during and/or after removal of the water.

According to the invention, higher molecular weight polyurethane polyelectrolytes are preferably used. By "polyurethane polyelectrolytes" is meant compounds having terminal reactive methylol groups and which have been obtained from higher molecular weight polyisocyanates and methylol compounds, and which have:

(1) an average molecular weight of less than about 25,000, preferably about 2,000 to about 10,000,
(2) hydrophobic nonionic chain segments of at least 60 chain links,
(3) 4 to 120 milliequivalents percent, preferably 8 to 80 milliequivalents of salt groups or of groups which are capable of salt formation and which are converted into salt groups in the course of the process, and
(4) a viscosity of less than about 1,500 and preferably about 100 to about 1,000 poises at 120° C.

The polyurethane electrolyte is dispersed with water at about 20 to about 150° C., preferably at about 50 to about 130° C., the quantity of water being from about 0.5 to about 4 times the quantity of polyurethane polyelectrolyte. The polyurethane electrolyte is then subjected to a heat treatment at about 25 to about 200° C., preferably about 70 to about 150° C. before and/or during and/or after removal of the water.

Particularly suitable compounds with reactive methylol groups are amine-formaldehyde resins or phenol-formaldehyde resins with free methylol groups.

It is also advantageous to adjust the polyurethane dispersions to a pH between 4 and 2 before, during or after the heat treatment.

In one preferred embodiment of the invention, the polyurethane polyelectrolyte which contains methylol groups is prpared during or immediately before dispersion, by the reaction between an aqueous formaldehyde solution and a polyurethane polyelectrolyte which contains acylated amino groups which are reactive with formaldehyde.

In one particularly suitable embodiment of the invention, the polyurethane polyelectrolyte which contains methylol groups is prepared by the action of a formaldehyde-containing aqueous solution at temperatures above about 50° C. on a poyurethane polyelectrolyte which has been obtained from compounds with reactive hydrogen atoms and a molecular weight of about 50 to about 20,000 and polyisocyanates and which contains at least 4 milliequivalents percent of salt groups or groups which are capable of salt formation and which are converted into salt groups in the course of the process, as well as terminal acylated amino groups which are reactive with formaldehyde.

According to the invention it is also especially advantageous to use, in a further embodiment of the invention, a polyurethane polyelectrolyte which contains methylol groups which has been prepared from a (potential) polyurethane polyelectrolyte which is free from NCO groups and which has been obtained from compounds which contain reactive hydrogen atoms and have a molecular weight of about 50 to about 20,000, preferably about 50 to about 8,000, and polyisocyanates, and which (1) has an average molecular weight of less than about 25,000, preferably about 2,000 to about 10,000,
(2) contains hydrophobic nonionic chain segments of at least 60 chain links,
(3) contains 4 to 120 milliequivalents percent, preferably 8 to 80 milliequivalents percent of salt groups or of groups which are capable of salt formation which are converted into salt groups in the course of the process,
(4) has a viscosity of less than 1,500 poises and preferably 50 to 1,000 poises at 120° C. and
(5) contains terminal acylated amino groups of the general formula

—X—NHR which are reactive with formaldehyde, in which formula:

X represents 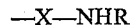

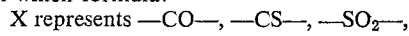

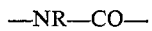

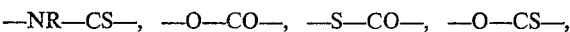

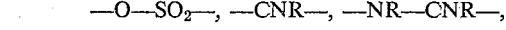

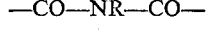

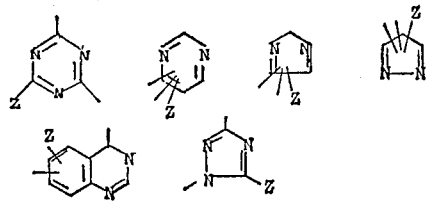

and

Z represents

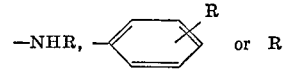

and

R preferably denotes a hydrogen atom or an alkyl radical or an alkenyl radical which has 1 to 4 carbon atoms and which may also be part of a heterocyclic 5-membered or 6-membered ring with 1 to 3 heteroatoms, and which may be substituted by OH, OCH₃, OC₂H₅, CCl₃, COOH, or SO₃H, or R denotes CN, CO—R', SO₂—R' (in which R' represents an alkyl, alkenyl, alkoxy or carboxyl radical with 1 to 4 carbon atoms), by the reaction therewith of aqueous formaldehyde-containing solutions at temperatures above about 50° C., preferably about 80 to about 150° C., the equivalent ratio of —X—NHR to formaldehyde being between 1:0.3 and 1:4 and the quantity of water amounting to about 0.5 to about 4 times the quantity of polyurethane.

In this process, the reaction with the aqueous solution which contains formaldehyde should preferably take place at pH values between 9 and 4.1. The acylated amino group —X—NHR is advantageously an unsubstituted —CO—NH₂ group or an unsubstituted urea or biuret group —NH—CO—NH₂. Polyurethane electrolytes which contain groups which are reactive with formaldehyde may also advantageously be prepared by the addition of compounds which contain (potential) salt groups to polyurethanes which contain reactive olefinic double bonds.

Those polyurethane polyelectrolytes which contain at least one of the following groups:

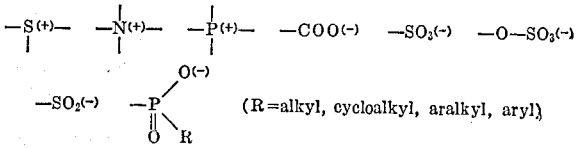

are particularly suitable for use in the present invention. In further embodiments of the present invention the polyurethane dispersions are adjusted to a pH of between 4.2 and 2 before, during or after the heat treatment, or 0.5–20 percent by weight of polyisocyanate of molecular weight 110–4,000 are incorporated in the dispersions by emulsification after the addition of at least half the total amount of water.

Dispersion, within the context of this invention, are heterogeneous two-phase water/polyurethane systems in general, especially those in which water forms the continuous phase. The term also covers sedimenting suspensions with particle diameters above approximately 5 m$\mu$, as well as colloidal solutions or sols with particle diameters of about 10 to 100$\mu$. The term does not, however, include optically clear, homogeneous aqueous solutions.

Compounds containing several reactive hydrogen atoms which are suitable for use in the preparation of the polyurethane polyelectrolytes for use according to the invention are linear or branched and have a molecular weight of 50–20,000, preferably 50–8,000. These compounds which are known per se have terminal hydroxyl, carboxyl, amino or mercapto groups. Especially advantageous higher molecular weight compounds within this class of compounds are polyhydroxyl compounds such as polyesters, polyacetals, polyethers, polythioethers, polyamides and polyester amides, and those vinyl polymers which have more than one hydroxyl group.

Suitable polyethers are, for example, the polymerization products of styrol oxide, ethylene oxide, propylene oxide, tetrahydrofuran, butylene oxide, epichlorohydrin and their copolymerization or graft polymerization products as well as the polyethers obtained by condensation of polyhydric alcohols or mixtures thereof and the polyethers obtained by alkoxylation of polyhydric alcohols, amines, polyamines and amino alcohols. Isotactic polypropylene glycol may also be used. Products which have a high ethylene oxide content are not suitable if they lead to the formation of water-soluble polyurethanes.

Suitable polyacetals are, for example, those polyacetals which can be prepared from such glycols as diethylene glycol, triethylene glycol, and 4,4'-dihydroxy-diphenyl-dimethylmethane, hexane diol, and formaldehyde. Suitable polyacetals can also be prepared by polymerization of cyclic acetals.

Particularly useful polythioethers are the condensation products of thiodiglycol with itself and/or with other glycols, dicarboxylic acids, formaldehyde, aminocarboxylic acids or aminoalcohols. Depending upon the co-component used the products are polythioethers, polythio mixed ethers, polythioether esters or polythioether esteramides. Polyhydroxyl compounds of this type can also be used in alkylated form or in mixture with alkylating agents.

Other polyesters, polyester amides and polyamides which may be used are the predominantly linear or branched condensates obtained from polyvalent saturated and unsaturated alcohols, amino alcohols, diamines, polyamines and mixtures thereof, e.g. polyester terephthalates or polycarbonates. Polyesters obtained from lactones, e.g. $\epsilon$-caprolactone, or from hydroxycarboxylic acids, may also be used. The polyesters may have terminal hydroxyl or carboxyl groups. The alcohol components used in their synthesis may also consist entirely or partly of higher molecular weight polymers or condensates such as polyethers, polyacetals or polyoxymethylenes. Unsaturated polyesters may be grafted with vinyl monomers.

The following are especially suitable components for use in the synthesis of polyesters: ethylene glycol, diethylene glycol, triethylene glycol, tetraethylene glycol, 1,2-propylene glycol, 1,3-propylene glycol, 2,3-butane diol, 1,4-butane diol, 1,5-pentane diol, 1,6-hexane diol, 2,2-dimethyl-1,3-propane diol, cyclohexane dimethanol, quinitol, glycerol, trimethylol propane, hexane triol, pentaerythritol, butene diol and 4,4'-bis-$\beta$-hydroxyethoxy-diphenyl dimethylmethane(bis - hydroxyethyldiane), and succinic acid, glutaric acid, adipic acid, suberic acid, phthalic acid, isophthalic acid, terephthalic acid, dimethyl terephthalate, terephthalic acid bis-glycol ester, maleic acid anhydride, fumaric acid, 6-hydroxy caproic acid, 4-hydroxybenzoic acid and trimellitic acid.

Polyhydroxyl compounds which already contain urethane or urea groups as well as natural polyols which may or may not be modified, such as castor oil, or carbohydrates may also be used.

In principle, polyhydroxyl compounds which contain basic nitrogen atoms, e.g. polyalkoxylated primary amines or polyesters or polythioethers in which an alkyl diethanolamine has been incorporated by condensation may also be used. Compounds which contain reactive halogen atoms may also be incorporated by condensation, e.g. glycerol-$\alpha$-chlorohydrin. Such compounds may also be in the alkylated or onium form. Polyesters with built in sulphonate or carboxylate groups such as those described, for example, in French patent specification No. 1,496,584 may be used. Of those polymers and copolymers of vinyl compounds which contain more than one hydroxyl group, those which have a molecular weight of 500 to 20,000 and contain 2 to 10 hydroxyl groups are preferably used. Examples of these are partially saponified vinyl acetate copolymers, low molecular weight polybutadienes which have OH groups and, above all, oxidized polyethylene or polypropylene, the method of preparation of which has been described, for example, in British patent specification No. 959,362.

In order to vary the lyophilic or hydrophobic properties and the mechanical properties of the products of the process, mixtures of different polyhydroxyl compounds may be used. Suitable higher molecular weight compounds which have amino end groups have been described, for example, in French patent specification Nos. 1,361,810 and 1,300,981, German Auslegeschrift No. 1,122,254 and United States patent specification No. 2,888,439.

One may use any aromatic and aliphatic diisocyanates, such as 1,5-naphthylene diisocyanate as starting materials for the preparation of the polyurethane polyelectrolytes used according to the invention. These compounds include 4,4'-diphenylmethane diisocyanate;
4,4'-diphenyl dimethyl methane diisocyanate;
di- and tetra-alkyldiphenylmethane diisocyanates;
4,4'-dibenzyl diisocyanate;
1,3-phenylene diisocyanate;
1,4-phenylene diisocyanate;
the isomers of toluylene diisocyanate, if desired mixtures thereof;
1-methyl-2,4-diisocyanatocyclohexane;
1,6-diisocyanate-2,2,4-trimethylhexane;
1,6-diisocyanato-2,4,4-trimethylhexane;
1-isocyanatomethyl-3-isocyanato-1,5,5-trimethylcyclohexane;
chlorinated and brominated diisocyanates;
phosphorus-containing diisocyanates;
4,4'-diisocyanatophenylperfluoroethane;
tetramethoxy-butane-1,4-diisocyanate;
butane-1,4-diisocyanate;
hexane-1,6-diisocyanate;
dicyclohexyl methane-diisocyanate;
cyclohexane-1,4-diisocyanate;
ethylene diisocyanate;
p-xylylene diisocyanate and
m-xylylene diisocyanate.

One may use the hydrogenation products of the abovementioned aromatic diisocyanates. Uurethane- and biuret- di- or tri-isocyanates may also be used, e.g. adducts of 1,6-hexane diisocyanate. 1,3-xylylene diisocyanate or 1-methyl-2,4-di - isocyanato - cyclohexane with water or amines or polyalcohols. One may also use isocyanates which contain ionic groups, such as those obtained, for example, by the addition of isocyanates with reactive halogen atoms to di- or polytertiary amines, bis-isocyanatoethyl phthalate, polyisocyanates which have reactive halogen atoms, such as 1-chloromethylphenyl-2,4-diisocyanate, 1-bromoethylphenyl-2,6-diisocyanate, and 3,3-bis-chloromethylether-4,4'-diphenylisocyanate. Suitable polyisocyanates which contain sulphur are obtained, for example, by reacting 2 mols of hexamethylene diisocyanate with 1 mol of thiodiglycol or dihydroxydihexyl sulphide. Triisocyanates or crude commercial mixtures of polyisocyanates may also be used. Of special interest are partly masked polyisocyanates, e.g. dimeric touylene diisocyanate, or polyisocyanates which have been partly reacted with, for example, phenol, tertiary butanol, phthalimide, caprolactam or methylethyl ketoxime. Aliphatic and araliphatic diisocyanates are especially preferred. Mixtures of different isocyanates may be suitable.

The low molecular weight compounds with reactive hydrogen atoms which may be used in the preparation of the polyurethane electrolytes used according to the invention include the following compounds:

(1) The usual saturated unsaturated glycols such as ethylene glycol or condensates of ethylene glycol; butanediol-1,3-; butanediol-1,4; butenediol; propanediol-1,2; propanediol-1,3; neopentyl glycol, hexanediol; bishydroxymethylcyclohexane; 1,4-bis-β-hydroxyethoxy benzene; 4,4' - bis-hydroxyethoxy-diphenyl-dimethylmethane, bis-glycol terephthalate; succinic acid di-β-hydroxyethylamide; succinic acid di-[N-methyl-(β-hydroxyethyl)]-amide; 1,4-di-[β - hydroxy-methyl-mercapto)-2,3,5,6-tetrachlorobenzene; 2-methylidenepropanediol-(1,3) and 2-methylpropanediol-(1,3).

(2) Aliphatic, cycloaliphatic and aromatic diamines such as ethylene diamine, hexamethylene diamine, 1,4-cyclohexylene diamine, benzidine, diamino-diphenylmethane, dichloro-diamino-diphenylmethane, the isomers of phenylene-diamine, hydrazine, ammonia, carbohydrazide, adipic acid dihydrazide, sebacic acid dihydrazide, piperazine, N-methyl-propylenediamine, 4,4'-diaminodiphenyl sulphone, 4,4'-diaminodiphenyl ether, 4,4'-diamino-diphenyldimethylmethane and 2,4-diamino-6-phenyltriazine.

(3) Aminoalcohols such as ethanolamine, propanolamine, butanolamine, N-methylethanolamine and N-methyl-isopropanolamine.

(4) Aliphatic, cycloaliphatic, aromatic and heterocyclic mono- and diamino-carboxylic acids such as glycine, α- and β-alanine, 6-aminocaproic acid, 4-aminobutyric acid, the isomeric mono- and diamino-benzoic acids, and the isomeric mono- and diaminonapthoic acids as well as alkyesters thereof.

(5) Water.

Less common chain lengthening agents, e.g. high melting chain lengthening agents with reactive hydrogen atoms are also suitable for use in the present invention, e.g.

4,4'-di-(N-methyl-β-hydroxyethylamino)-diphenylmethane,
ethyl-bis-3-hydroxy-cyclohexyl-phosphine oxide,
N,N'-dimethyl-ethylenediamine, oxalamidrazone,
oxalic acid bis-ethanolamide,
2,6-di-(hydroxymethyl)-tetrahydropyran,
di-(hydroxy-neopentylidene)-pentaerythritol,
dimethylol tetrahydropyrimidinethione,
N,N'-bis-(2-aminoethyl) oxalic acid amide,
N,N'-bis-(2-aminopropyl)-oxalic acid amide,
dihydroxydiethyl sulphone,
4-methylamino-butanol-(2),
N,N'-carboxybutylurea,
methylene-bis-benzoic acid,
methylene-bis-benzyl alcohol,
hexane-bis-semicarbazide,
γ-hydroxybutyric acid hydrazide,
6-aminocaproic acid hydrazide,
phenyl glycol,
dimethyloldihydropyran,
dimethyloltetrahydrofuran,
tetrachlorobutane diol,
dithiooxamide,
pentaerythritol-mono-acetone ketal,
pentachlorophenyl glycerol ether,
1,4-dipiperazino-butane-2,3-diol,
sulphuryl disulphamide,
1,1-(di-hydroxymethyl)-Δ3-cyclohexene,
lauric acid di-(hydroxyethyl)-amide,
isobutylenediureide, and the following compounds:

HO(CH$_2$)$_2$—NH—CO—CO—NH—(CH$_2$)$_6$—NH—CO—CO—NH(CH$_2$)$_2$—OH

HOOC—CH$_2$—NH—CO—CO—NH—⟨C$_6$H$_4$⟩—SO$_2$—⟨C$_6$H$_4$⟩—NHCO—CO—NH—CH$_2$—COOH

HOOC—CH$_2$—NH—CO—CO—NH—⟨C$_6$H$_4$⟩—P(CH$_3$)(=O)—⟨C$_6$H$_4$⟩—NH—CO—CO—NH—CH$_2$—COOH

HO—CH$_2$—C(CH$_3$)(CH$_3$)—CO—O—CH$_2$—C(CH$_3$)(CH$_3$)—CH$_2$—OH    HO—CH$_2$—C(CH$_3$)(CH$_3$)—CO—NH—CH$_2$—C(CH$_3$)(CH$_3$)—CH$_2$—OH

HO—(CH$_2$)$_2$—NH—CO—CO—NH—⟨C$_6$H$_4$⟩—P(CH$_3$)(=O)—⟨C$_6$H$_4$⟩—NH—CO—CO—NH—(CH$_2$)$_2$—OH

HO—(CH$_2$)$_2$—NH—CO—CO—NH—⟨C$_6$H$_4$⟩—SO$_2$—⟨C$_6$H$_4$⟩—HN—CO—CO—NH—CH$_2$—CH$_2$—OH

HO—(CH$_2$)$_2$—NH—CO—CO—N⟨piperazine⟩N—CO—CO—NH—CH$_2$—CH$_2$—OH

HO—(CH$_2$)$_2$—CO—NH—(CH$_2$)$_6$—NH—CO—(CH$_2$)$_2$—OH

When such chain lengthening agents which are strongly polar and capable of forming hydrogen bridge bonds are used in combination with ionic chain lengthening agents such as those formed by salt formation of basic chain lengthening agents, they yield products of exceptionally high strength and water resistance even under the action of moisture and solvents.

Chain lengthening agents with at least one basic nitrogen atom are, for example, mono-, bis- or polyalkoxylated aliphatic, cycloaliphatic, aromatic or heterocyclic primary amines such as N-methyldiethanolamine,
N-ethyldiethanolamine,
N-propyl-diethanolamine,
N-isopropyl-diethanolamine,
N-butyl-diethanolamine,
N-isobutyl-diethanolamine,
N-oleyl-diethanolamine,
N-stearyl-diethanolamine,
hydroxyethylated amines of coconut oil,
N-allyl-diethanolamine,
N-methyl-diisopropanolamine,
N-ethyl-diisopropanolamine,
N-propyl-diisopropanolamine,
N-butyl-diisopropanolamine,
N-cyclohexyl-diisopropanolamine,
N,N-dihydroxyethyl aniline,
N,N-dihydroxyethyl-toluidine,
N,N-dihydroxyethyl-α-aminopyridine,
N,N'-dihydroxyethyl-piperazine,
dimethyl-bis-hydroxyethylhydrazine,
N,N'-bis-(β-hydroxy-ethyl)-N,N'-diethylhexahydro-p-phenylene-diamine,
N-β-hydroxyethyl piperazine and polyalkoxylated amines such as hydroxypropylated methyl-diethanolamine. One may also use, for this purpose, compounds such as N-methyl-N,N-bis-γ-aminopropylamine,
N-(γ-aminopropyl)-N,N'-di-methylethylene diamine,
N-(γ-aminopropyl)-N-methyl-ethanolamine,
N,N'-bis-(γ-aminopropyl)-N,N'-dimethylethylenediamine,
N,N'-bis-(γ-amino-propyl)piperazine,
N-(β-aminoethyl)-piperazine N,N'-bis-hydroxyethyl-propylene diamine,
2,6-diaminopyridine,
diethanolamino acetamide,
di-ethanolaminopropionamide,
N,N-bis-hydroxyethyl-phenyl-thiosemicarbazide,
N,N-bis-hydroxyethyl-methylsemicarbazide,
p,p'-bis-aminomethyl-dibenzyl-methylamine and
2,6-diaminopyridine.

Suitable chain lengthening agents with quaternizable halogen atoms or R—SO₂O groups are, for example, glycerol-α-chlorohydrin, glycerol monotosylate, pentaerythritol-bis-benzene sulphate, glycerol monomethane-sulphonate, adducts of diethanolamine and chloromethylated aromatic isocyanates or aliphatic halogen isocyanates, such as N,N-bis-hydroxyethyl-N'-m - chloromethylphenyl urea, N-hydroxyethyl-N'-chlorohexyl urea, glycerolmonochloroethylurethane, bromoacetyl dipropylene triamine, and chloroacetic acid diethanolamide.

Tri- or higher functional components may be used, e.g. branched polyesters or polyethers, tri- or higher functional isocyanates such as tris-isocyanatohexyl biuret or cyclic isocyanurate oligomers of diisocyanates. Higher functional chain lengthening agents such as glycerol, trimethylol propane, pentaerythritol, dipropylene triamine, hexane triol or triethanolamine may also be used.

Monofunctional compounds which have only one group that is reactive with isocyanates may also be included, e.g. (un)saturated fatty alcohols, fatty amines or fatty acids, resinic acids, N,N-dimethylethanolamine
N,N-diethylethanolamine,
1-dimethylaminopropanol-(2),
N-hydroxyethylmorpholine,
N-methyl-N-β-hydroxyethyl aniline,
N-hydroxyethyl piperidine,
α-hydroxyethyl pyridine,
γ-hydroxyethyl quinoline,
N,N-dimethyl hydrazine,
N,N-dimethylethylenediamine,
1-diethylamino-4-aminopentane,
α-aminopyridine,
3-amino-N-ethyl carbazol,
N,N-dimethylpropylene diamine,
N-amino-propyl-piperidine,
N-aminopropylmorpholine,
N-aminopropyl-ethylene-imine and
1,3-bispiperidino-2-aminopropane.

Different chain lengthening agents may be used in combination.

The following compounds are examples of monofunctional alkylating agents which may be used for converting the basic reactants into the salt form when preparing the polyurethane polyelectrolytes: methyl chloride, methyl bromide, methyl iodide, ethyl bromide, propyl bromide, butyl bromide, dimethyl sulphate, diethyl sulphate, methyl chloromethyl ether, methyl 1,2-dichloroethyl ether, ethyl chloromethyl ether, benzyl chloride, benzyl bromide, p-chlorobenzyl chloride, trichlorobenzyl chloride, p-nitrobenzyl chloride, ethylene chlorohydrin, ethylene bromohydrin, epichlorohydrin, ethylene oxide, propylene oxide, styrene oxide, benzene-, toluene-, naphthalene-sulphonic acid esters, ω-bromoacetophenone, dinitrochlorobenzene, δ-chloropenteneamide, chloroacetic acid and its ester and amides, chloromethyl-dimethyl-ethoxysilane, pentamethyl-chloromethyl - disiloxane, pentamethyl-bromomethyl-disiloxane, glycol monobromoacetic acid ester, glycerol monochloracetic acid ester, bromoethyl isocyanate, chloromethyl naphthalene, 3-methyl-3-hydroxymethyl oxetane methane sulphonate, phenylethylbromide, p-2-bromoethyl benzoic acid, 5-chloromethyl-furan-2-carboxylic acid, ethyl phosphonous acid dichloroisopropyl ester, bromoethyl acetoacetate, 1,3-propane sultone, 1,4-butane sultone. Additional examples of these compounds may be found in German Auslegeschrift No. 1,205,087.

Quaternizations may also be carried out with cyanogen chloride or cyanogen bromide. Epoxies may be used in combination with water and/or an acid as quaternizing agents:

Polyfunctional alkylating agents are also suitable, e.g. 1,4-dibromobutane, p-xylylene dichloride, 1,3-dimethyl-4,6-bis-chloromethyl benzene, methylene bis-chloroacetamide, hexa-methylene-bis-bromoethyl urethane and adducts of 2-3 mols of chloroacetamide with di- or triisocyanate. Other suitable polyfunctional alkylating agents are given in, for example, published Dutch patent application No. 67/03743.

Examples of tertiary amines which may be used in the quaternization reaction are trimethylamine, triethylamine, triethanolamine, dimethylaminoethanol, N - methyl-diethanolamine, pyridine, quinoline and N-dimethylaminopropyl-diethanolamine.

One may also use, at this stage of the reaction for the salt formation, various acids including those which, at the same time, have a chain lengthening function, e.g. sulphurous acid, sulphuric acid, hypophosphorous acid, phosphinic acids, phosphonous acids and phosphonic acids, glycollic acids, lactic acid, succinic acid, tartaric acid, oxalic acid, phthalic acid and trimellitic acid.

Other suitable acids are mentioned in German patent specifications Nos. 1,178,586 and 1,179,363. Particularly advantageous acids are those which greatly increase the hydrophilic character and, in particular, the dispersibility of the polyurethanes, such as hydrochloric acid, fluoboric acid, amidosulphonic acid, phosphoric acid and their derivatives, tartaric acid, oxalic acid, lactic acid, acetic acid and acrylic acid. Various salt-forming agents may also be used in combination therewith. A synergistic effect is thereby achieved in connection with the dispersibility.

Insofar as the compounds with reactive hydrogen atoms hitherto mentioned contain basic nitrogen atoms or divalent sulphur atoms, in combination with alkylating agents or acids, they serve for the formation of cationic polyurethane polyelectrolytes. Accordingly, cationic polyurethane polyelectrolytes can be prepared from compounds with reactive hydrogen atoms, reactive halogen atoms or ester groups of strong acids in combination with tertiary, secondary or primary amines, organic sulphides or phosphines.

The polyurethanes can also be correspondingly modified anionically by the incorporation of suitable compounds. Suitable starting compounds for the preparation of these polyurethane polyelectrolytes are compounds which have at least one hydrogen atom which will react with isocyanate groups and at least one anionic salt type group which is capable of anionic salt formation or if desired mixtures thereof:

(1) Hydroxy acids and mercapto acids such as glyceric acid, glycollic acid, thioglycollic acid, lactic acid, trichlorolactic acid, malic acid, dihydroxymalic acid, dihydroxyfumaric acid, tartaric acid, dihydroxy tartaric acid, mucic acid, saccharic acid, citric acid, glyceroboric acid, pentaerythritol-boric acid, mannito-boric acid, salicylic acid, 2,6-dihydroxybenzoic acid, protocatecuic acid, α-resorcylic acid, β-resorcylic acid, hydroquinone-2,5-dicarboxylic acid, 4-hydroxyisophthalic acid, 4,6-dihydroxyisophthalic acid, hydroxyterephthalic acid, 5,6,7,8-tetrahydro-naphthal-(2)-carboxylic acid-(3), 1-hydroxynaphthoic acid-(2)-carboxylic acid-(3), 1-hydroxynaphthoic acid-(2), 2,8-dihydroxynaphthoic acid-(3), β-hydroxypropionic acid, m-hydroxybenzoic acid, pyrazolone carboxylic acid, uric acid, barbituric acid and 2,6-bis-hydroxymethyl-p-cresol, tris - hydroxymethyl-acetic acid, α,α-bis-hydroxymethyl-propionic acid, α,α-bis-hydroxymethyl-butyric acid.

(2) Aliphatic, cycloaliphatic, aromatic and heterocyclic mono- and diaminocarboxylic acids such as glycine, α- and β-alanine, 6-aminocaproic acid, 4-aminobutyric acid, sarcosine, methionine, leucine, isoleucine, serine, valine, ornithine, histidine, lysine, proline, phenylalanine, threonine, cystein, asparagine, glutamine, arginine, aspartic acid, glutamic acid, oxaluric acid, anilidoacetic acid, anthranilic acid, 2-ethylaminobenzoic acid, 3-aminobenzoic acid, 4-aminobenzoic acid, N-phenylaminoacetic acid, 3,4-diaminobenzoic acid and 5-aminobenzene dicarboxylic acid.

(3) Aliphatic, cycloaliphatic, aromatic and heterocyclic di- and polycarboxylic acid such as oxalic acid, malonic acid, succinic acid, glutaric acid, adipic acid, pimelic acid, suberic acid, azelaic acid, sebacic acid, the isomeric phthalic acids, diphenic acids, the isomeric naphthalic acids, maleic acid, thiodiglycollic acid, fumaric acid, sulphodiacetic acid, diglycollic acid, methylene-bis-thioglycollic acid, the isomeric pyridinocarboxylic acids, the isomeric quinoline dicarboxylic acids, citric acid, ethylene diaminotetracetic acid and nitrilotriacetic acid;

(4) Hydroxy- and carboxy-sulphonc acids: 2-hydroxyethane sulphonic acid, phenolsulphonic acid-(2), phenolsulphonic acid-(3), phenolsulphonic acid-(4), phenoldisulphonic acid-(2,4), sulphoacetic acid, m-sulphobenzoic acid, p-sulphobenzoic acid, benzoic acid-(1)-disulphonic acid-(3,5), 2-chlorobenzoic acid -(1)-sulphonic acid-(4), 2-hydroxybenzoic acid-(1)-sulphonic acid-(5), naphthol-(1)-sulphonic acids, naphthol-(1)-disulphonic acids, 8-chloronaphthol-(1)-disulphonic acid, naphthol-(1)-trisulphonic-acids, naphthol - (2) - sulphonic acid-(1), naphthol-(2)-trisulphonic acids; 1,7-dihydroxynaphthalenesulphonic acid-(3), 1,8-dihydroxynaphthalenedisulphonic acid-(2,4), chromotropic acid, 2 - hydroxynaphthoic acid-(3)-sulphonic acid-(6) and 2-hydroxycarbazol-sulphonic acid-(7);

(5) Aminosulphonic acids: Amidosulphonic acid, hydroxylamine-monosulphonic acid, hydrazine disulphonic acid, sulphanilic acid, N-phenylaminomethanesulphonic acid,
4,6-dichloroaniline sulphonic acid-(2),
phenylene diamine-(1,3)-disulphonic acid-(4,6),
N-acetyl-naphthylamine-(1)-sulphonic acid-(3),
naphthylamine-(1)-sulphonic acid,
naphthylamine-(2)-sulphonic acid,
naphthylamine disulphonic acids,
naphthylamine trisulfonic acids,
4,4'-di-(p-aminobenzoyl-amino)diphenyl urea disulphonic acid-(3,3'),
phenyl hydrazine disulphonic acid-(2,5),
2,3-dimethyl-4-aminobenzene disulphonic acid-(4',5),
4'-aminostilbene disulphonic acid-(2,2')-(4-azo-4)-anisole,
carbazole disulphonic acid-(2,7),
taurine,
methyltaurine,
butyl taurine,
3-amino-benzoic acid-(1)-sulphonic acid-(5),
3-aminotoluene-N-methane-sulphonic acid,
6-nitro-1,3-dimethylbenzene-4-sulphamic acid,
4,6-diaminobenzene disulphonic acid-(1,3),
2,4-diaminotoluene sulphonic acid-(5),
4,4'-diaminodiphenyl-disulphonic acid-(2,2'),
2-aminophenolsulphonic acid-(4),
4,4'-diamino-diphenylether-sulphonic acid-(2),
2-aminoanisole-N-methane sulphonic acid,
2-amino-diphenylamino-sulphonic acid,
ethylene glycol sulphonic acid and
2,4-diaminobenzene sulphonic acid;

(6) Organo phosphorous compounds such as derivatives of phosphinic acid, phosphonous acids, phosphonic acids and phosphoric acids as well as the esters of phosphorous acid and of phosphoric acid and their thioanalogues, e.g. bis-(α-hydroxyisopropyl)phosphinic acid hydroxyalkane phosphonic acid, phosphorous acid bis-glycol ester, phosphorous acid bis-propylene glycolester, phosphoric acid, phosphoric acid bis-ethylene glycol ester and phosphoric acid bis-propylene glycol ester;

(7) Furthermore, one may use as hydroxy-, mercapto- and aminocarboxylic acids and sulphonic acids, polycarboxylic acids and polysulphonic acids, the (saponified) products of unsaturated acids such as acrylic acid, methacrylic acid and unsaturated nitrile such as acrylonitrile; of cyclic dicarboxylic acid anhydrides such as maleic acid anhydride, phthalic acid anhydride and succinic acid anhydride; of sulphocarboxylic acid anhydrides such as the anhydride of sulphoacetic acid and of o-sulphobenzoic acid; of lactones such as β-propiolactone and γ-butyrolactone, the addition products of the reaction products of olefines with sulphur trioxide, such as carbyl sulphate; of epoxycarboxylic and epoxysulphonic acids such as glycidic acid and 2,3-epoxypropane sulphonic acid, of sultones such as 1,3-propane sultone, 1,4-butane sultone and 1,8-naphthosultone or of disulphonic acid anhydrides such as benzene disulphonic acid-(1,2) anhydride with aliphatic and aromatic amines such as 1,2-ethylene diamine, 1,6-hexamethylene diamine, the isomeric phenylene diamines, diethylene triamine, triethylene tetramine, tetraethylene pentamine, pentaethylene hexamine, hydrazines or alkylated hydrazines, ammonia, amino alcohols such as the hydroxyalkylated amines and hydrazines, for example compounds such as ethanolamine, diethanolamine, triethanolamine, ethanol ethylenediamine and ethanol hydrazine; alcohols such as ethylene glycol, propylene glycol, 1,3- and 1,4-butane diol, 1,6-hexane diol; polyhydric alcohols such as trimethylol propane, glycerol and hexane triol; the addition products (which may be hydrogenated), of epoxy and ethylene imine compounds such as ethylene oxide, propylene oxyde, butylene oxyde, styrene oxide and ethylene imine, and unsaturated nitriles such as acrylonitrile with aliphatic and aromatic aminocarboxylic acids and aminosulphonic acids; the reaction products of hydroxyalkane sulphonic acids, halogenated carboxylic and sulphonic acids with optionally alkylated hydrazines such as hydrazine acetic acid, hydrazine ethane sulphonic acid and hydrazine methane sulphonic acid; the saponified addition products of cyanohydrins with hydrazine such as 1,2-hydrazine-bis-isobutyric acid; furthermore one may use the addition products of sodium hydrogen sulphite with olefinically unsaturated compounds such as allyl alcohol, maleic acid, maleic acid bis-ethylene- and bis-propylene-glycol ester;

(8) Hydrazine carboxylic acids such as hydrazine dicarboxylic acids.

(9) Higher molecular weight condensates such as polyesters which contain carboxyl groups.

The following are examples of compounds which are suitable for conversion into the salt form for use in the preparation of anionic polyurethane polyelectrolytes:

(1) Organic bases such as monofunctional primary, secondary and tertiary amines, for example, methylamine, diethylamine, triethylamine, trimethylamine, dimethylamine, ethylamine, tributylamine, pyridine, aniline, toluidine, alkoxylated amines such as ethanolamine, diethanolamine, triethanolamine, methyldiethanolamine, dimethylamine ethanol, oleyl diethanolamine and polyfunctional polyamines in which the individual amino groups may differ in basicity, e.g. the polyamines obtained by hydrogenation of addition products of acrylonitrile with primary and secondary amines or peralkylated or partially alkylated polyamines such as N,N-dimethylethylene diamine; furthermore, one may use such compounds as α-aminopyridine and N,N-dimethylhydrazine;

(2) Inorganic bases, compounds which are basic in reaction or which split off bases, such as ammonia, monovalent metal hydroxides, carbonates and oxides, such as sodium hydroxide and potassium hydroxide. One may also use a combination of different salt forming compounds. The carboxyl groups of such compounds may be only partly neutralized.

Cationic and anionic polyurethane polyelectrolytes can also be prepared by subsequently modifying nonionic polyurethanes to render them cationic or anionic by addition reactions. Thus, for example, polyurethanes which have unsaturated C=C double bonds may be modified to form polyelectrolytes by the addition of compounds which contain at least one OH, SH, NHR or SCl group which is capable of addition reactions, and another group which is capable of salt formation, e.g.

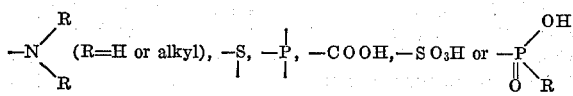

or a corresponding salt group.

The following are examples of such compounds which are capable of undergoing addition reactions:

Thioglycollic acid, glycollic acid, β-chlorosulphenylpropionic acid, β-alanine-Na, lysine, dimethylaminoethanol, diethylaminoethylmercaptan, N,N - dimethylpropylenediamine, methyl-2-hydroxyethylsulphide, ethyl-2-mercaptoethylsulphide, taurine, N-methyltaurine, 2-mercaptoethyl sulphonic acid sodium, N,N-dimethylhydrazine, N,N-dimethylethylenediamine and sodium hydrogen sulphite.

Polyurethanes which are themselves nonionic may also be ionically modified by reaction with monoisocyanates which contain tertiary amino, sulphide or reactive halogen groups. After conversion of the said groups into the salt form by reaction with tertiary amines or quaternizing agents or acids, the polyurethane is modified by ionic side chains.

The following are examples of compounds which are suitable for carrying out such modifications: chloroethyl isocyanate, bromoethyl isocyanate, chlorohexyl isocyanate, the isomers of chloromethylphenyl isocyanate, chloromethyltolyl isocyanate, dimethylaminoethyl isocyanate, adducts of amino alcohols, diamines and thioether alcohols or thioether amines with mono- and polyisocyanates, and methyl mercaptoethyl isocyanate.

Polyurethanes may even be ionically modified by reaction with cyclic compounds which have 3–7 ring members which have salt type groups or groups which are capable of salt formation after ring opening, e.g. dicarboxylic acid anhydrides, disulphonic acid anhydrides, sulphocarboxylic acid anhydrides, sultones, lactones, epoxycarboxylic acids, epoxysulphonic acids, N-carboxyglycine anhydride, carbyl sulphate. This method of modification has been fully described in German Auslegeschrift No. 1,237,306. The processes described in Belgian patent specifications Nos. 636,799 and 658,026 may also be used for the production of cationic polyurethanes which may be used as starting material for the process according to the present invention.

The sequence in which the components used for synthesizing the polyurethane polyelectrolytes are added is, in principle, immaterial. One may, for example, mix all the components together at room temperature or elevated temperature, including the component which carries at least one acylated amino group, which component is to be described in more detail below, or the di- or polymethylol compound, and then let all these components react together, in which case the reaction mixture usually has to be heated to about 100–160° C. However, if a basic component or a catalyst is present, the reaction usually takes place spontaneously. Alternatively one may first prepare an NCO-containing prepolymer in known manner and then react this. In one especially preferred method, the (potential) salt groups are located as near as possible to the ends of the chains so that a very distinct block structure is formed as far as possible, with a hydrophobic chain segment of 130–400 chain members being present. This is achieved, for example, by first preparing a higher molecular weight prepolymer from polyhydroxyl compounds and polyisoyanates which are free from (potential) salt groups and then reacting this prepolymer with chain lengthing agents which carry (potential) salt groups, more polyisocyanate and the component which carries at least one acylated amino group or the component which carries at least one and preferably more than one methylol group.

According to a preferred procedure, the polyurethane electrolytes which are to be dispersed should have a molecular weight of less than 25,000, preferably 2,000 to 10,000 and have terminal groups of the general formula —X—NHR which are reactive with formaldehyde,

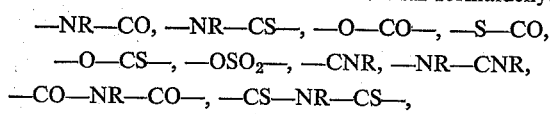

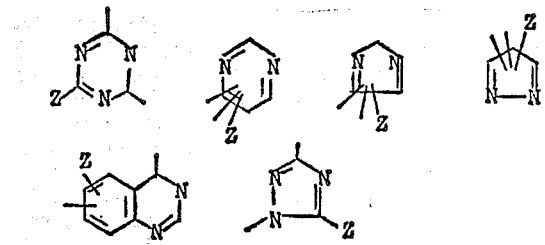

and Z represents

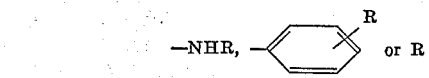

and R represents hydrogen (preferably) or an alkyl or alkenyl radical with 1 to 4 carbon atoms, which may be substituted by OH, —OCH$_3$—, —OC$_2$H$_5$, —CCl$_3$,

or —SO$_3$H; R may also represent CN, COR', SO$_2$R' in which R' represents an alkyl, alkenyl, alkoxy or carboxyalkyl radical with 1 to 4 carbon atoms.

These are, therefore, acylated amino end groups or quasi acylated amino groups which are situated on a polarized C=N double bond. Furthermore, R may also be part of a 5–7 membered heterocyclic ring containing 1 to 3 heteroatoms, e.g. O, S or N. The group —X—NH—R may be situated inside or outside the ring.

The simplest way of preparing the polyurethane polyelectrolytes according to the invention is first to synthesize a polyurethane which has terminal NCO groups and an average molecular weight of less than 20,000 (preferably 1,000 to 10,000) from the compounds with reactive hydrogen atoms mentioned earlier and a molar excess of polyisocyanates. This corresponds to a free NCO group content of 0.3–20 percent (preferably 0.8–10 percent). An NCO group content of between 1.5 percent and 6 percent is particularly preferred. The quantity of NCO groups present is then generally at least 2 per polyurethane molecule. Such prepolymers are obtained in known manner by using an NCO/OH ratio of between 1.1 and 2.

According to a special embodiment of the process, this prepolymer is then reacted with compounds which contain at least one of the groups X—NH—R defined above and in addition a group Y which can react with NCO groups. This group Y may, for example, be —OH, —NH$_2$, —NH—R$_1$, —SH, —COOH, —CONH$_2$, —CSNH$_2$, —CO—NH—NH$_2$, —NH—CO—NH$_2$

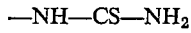

or —NH—NH$_2$.

The compounds which are suitable for reaction with the prepolymers which contain NCO groups are thus at least monofunctional both towards isocyanates and towards formaldehyde and have the general formula Y—X—NHR or Y—R$_2$—(X—NHR)$_n$ wherein X and Y have the meanings indicated above, R$_2$ is a monovalent or higher valent organic radical, and $n$ is 1–4. R$_2$ is preferably an aliphatic, aromatic, cycloaliphatic or araliphatic radical with 1–18 carbon atoms which may also be substituted by alkoxy groups or halogen atoms. It is evident that —X—NHR may be the same as Y, since, for example, the carbonamide or the urea radical may react both with isocyanates and with formaldehyde.

The compounds Y—X—NH—R and

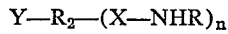

include, apart from these specific compounds which are directly formulated according to the definition of X and Y, so-called aminoplast-forming NH-containing components as defined for example in Angewandte Chemie 76, 909–919 (1964) and described therein (see also A. Bachmann and Th. Bertz.: Aminoplaste, 1967, VEB Deutscher Verlag für Grundstoffindustrie).

The essential condition is that the preformed polyurethanes which carry 0.3 to 20 percent of free NCO groups should react with the compounds Y—X—NHR or Y—R$_2$—(X—NHR)$_n$ and not with chain lengthening to form high molecular weight polyurethanes. In practice chain breaking should occur so that the average molecular weight does not exceed 25,000 and is preferably between 2,000 and 10,000. The average molecular weight can be estimated sufficiently accurately by, for example, end group determination of viscosimetric and osmometric molecular weight determination.

The most important factor when carrying out the reaction, in practice, is that when the formaldehyde-containing solutions are subsequently added, one should be able to mix the substance, e.g. as a solvent free melt, with them thoroughly by means of the usual mixing apparatus. The resulting polyurethane mass which contains terminal X—NHR groups should therefore have a viscosity of less than 1,500 poises at 120° C. The viscosity is preferably 50–1,000 poises.

Although the compounds Y—X—NHR or

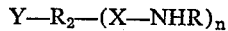

with which the prepolymers are mainly modified according to the invention are predominantly monofunctional in their reaction with isocyanates, they may also be partly incorporated as bifunctional compounds into the polyurethane moleculae, provided that the molecular weight or viscosity thereof, do not rise above the given limits.

If strongly cross-linked products are desired as end products after removal of water from the dispersion, e.g. by evaporation on a substrate, one may use the compounds Y—X—NHR or Y—R$_2$—(X—NHR)$_n$ in their bifunctional or polyfunctional form during the synthesis of the NCO-containing prepolymer.

Compounds of the formula Y—X—NHR include, for example, the following classes of compounds: ureas, sulphamides, semicarbazides, guanidines, oxamides, biurets, sulphonyl ureas, hydrazodicarbonamides, urethanes, cyanamides, acid amides, cyanuric acid amides, imidazolidones, tetrahydropyrimidones, hexahydropyrimidones, urones, hexahydro-1,3,5-triazinones and the corresponding thio compounds.

Individual representatives of these classes of compounds which are suitable for use in the process according to the invention, are, for example, urea, thiourea, sulphamide, semicarbazide, thiosemicarbazide, N-hydroxyurea, guanidine and its salts, methyl urea, ethyl urea, butyl urea, methyl thiourea, allyl thiourea, methyl sulphamide, methyl semicarbazide, methyl thiosemicarbazide, methyl guanidine, oxamide, thiooxamide, biuret, thiobiuret, imino oxamide, dithiooxamide, dithiobiuret, iminothiooxamide, aminosulphonyl urea, hydrazodicarbonamide, thiohydrazodicarbonamide, guanyl urea, aminosulphonyl thiourea, dithiohydrazodicarbonamide, guanyl thiourea, guanidinothiourea; N-aminooxamide, N-aminothiooxamide, hydrazocarboxylic acid ureide, hydrazocarboxylic acid thioureide, iminooxamide hydrazide, guanidino carbohydrazide, N-aminosulphamide, aminoguanidine, methylamino guanidine, guanidinourea, N,N'-dimethyl urea, N,N'-diethyl urea, ethylene urea (imidazolidone), 4,5-dihydroxyimidazolidone, 4,5-di-methoxyimidazolidone, hexahydropyrimidone, melamine, 5 - methyl-1,3,5-hexahydrotriazone, 5-ethyl-1,3,5-hexahydrotriazone, 1 - oxa-3,5-diazinone, 4 - ureido-6-methyl - hexahydropyrimidone, 4-ureido - 5 - hydroxyethyl-6-methyl-hexahydropyrimidone and other condensation products of urea with formaldehyde, acetaldehyde or isobutyraldehyde, triacetone diurea, tetrahydropyrimidone, 4,6,6 - trimethyl-2-thionotetrahydropyrimidone, methyl allophanate, trimethyl biuret, phenyl biuret, benzoyl biuret, amino biuret, cyanogen urea; biguanide, ammeline; thioammeline, carbonyl dicarbamate, urea dicarboxylic acid diamide, trimethylol melamine, guanazole, guanazine, dicyandiamide, 1 - hydroxy-2,2,2-trichloroethyl urea, N,N'-bis(1-hydroxy-2,2,2-trichloroethyl urea, acetylurea, trichloroacetyl urea, benzoyl urea, triuret, hexahydropyrimidone, acetyl guanidine, trichloroacetyl guanidine, methylsulphonyl urea, ethylsulphonyl urea, phenyl urea, N,N'-diphenyl urea, N,N'-ditolyl urea, N,N-o-phenylene urea, perinaphthylene urea, ethylene urea, acetylene urea, dimethylacetylene diureine, diphenylacetylene diureine, 2,4-dimethylsemicarbazide, o-hydroxy-ethylisourea, diphenylguanidine, N - methyl-N'-acetyl-guanidine, amino guanidine, anilidoguanidine, N-amino - N - phenyl - guanidine, acetoguanamine, acetoguanide, oxamidic acid, oxalauric acid, thio-oxamidic acid, methylol urea, N,N'-bis-methylol urea, hydroxyethyl urea, N,N'-bis-hydroxyethyl urea.

Compounds of the formula Y—R$_2$—(X—NH—R)$_n$ include the following: glycollic acid amide, glycollic acid thioamide, hydroxymethylsulphonamide, hydroxymethyl urea, hydroxymethyl thiourea, iminoglycollic acid amide, hydroxymethyl guanidine, glycine amide, glycine thioamide, aminomethyl sulphonamide, aminomethyl urea, aminomethyl thiourea, iminoglycine amide, aminomethyl guanidine, sarcosine amide, sarcosine thioamide, butylaminomethyl sulphonamide, thioglycollic acid amide, thioglycollic acid thioamide, malonic acid diamine, thiomalonic acid diamide aminosulphonyl acetamide, ureidoacetamide, thioureidoacetamide, carbamic acid-glycollic acid amide ester, carbamic acid-thioglycollic acid amide ester, thiocarbamic acid-glycollic acid amide ester, amidosulphonic acid glycollic acid amide ester, guanyl acetamide, guanidino acetamide, malonic acid dithioamide, aminosulphonyl thioacetamide, ureidothioacetamide, thioureidothioacetamide, carbamic acid glycollic acid thioamide ester, ureidomethylsulphonamide, methylene - bis - urea, ureidomethyl-thiourea, ureidomethylguanidine, thioureidomethylsulphonamide, methylene-bis-thiourea, thioureidomethyl guanidine, malonic acid amide hydrazide, aminosulphonyl acetohydrazide, ureidoacetohydrazide, thioureidoacetohydrazide, carbamoylacetohydrazide, amidosulphonic acid glycollic acid hydrazide, guanidonoacetohydrazide, glycollic acid ureide, glycine ureide, sarcosine ureide, thioglycollic acid ureide, malonic acid amide ureide, malonic acid thioamide ureide, ureidoacetoureide, malonic acid ureidohydrazide, hydrazino-acetoureide, hydrazinoacetamide, hydrazinothioacetamide, aminosulphonyl methylhydrazine, hydrazinomethyl urea, hydrazinomethyl thiourea, carbamoyl methyl hydrazine, glycollic acid thioureide, glycine thioureide, ethylaminomethyl urea, N-methyl-N'-methylaminomethyl urea, malonic acid monoamide, carboxymethyl urea, carbamylacetic acid, thiocarbamyl-O-acetic acid, thiocarbamyl-S-acetic acid, amidosulphonic acid-glycollic acid ester, carboxymethyl guanidine, guanyl acetic acid, malonic acid monoureide, 2-hydroxypropionic acid amide, 1-hydroxypropionic acid amide, 2-hydroxyethylthiopropionamide, 2-hydroxyethyl sulphonamide, N - methyl-2-hydroxyethylsulphonamide, 2-hydroxyethyl urea, 4,4'-diureidomethyldiphenyl oxide, ethylene-bis-methanesulphonamide, hexamethylene-bis-p-toluene sulphonamide, 4,4'-diureidomethylbenzene, N,N'-bis-(2-hydroxyethyl)-urea, N,N,N'-tris-(2-hydroxyethylurea), N,N-bis(2-hydroxyethyl)urea, 2-hydroxyethyl thiourea, N,N-bis-(2-hydroxyethyl)-thiourea, 2 - hydroxyethylurethane, ethylene-glycol-bis-carbamic acid ester, 2-hydroxyethylguanidine, 2 - hydroxypropionic acid ureide, $\beta$-alanine amide, $\alpha$-alanine amide; sarcosineamide, taurine amide, N-methyl-taurine amide, 2-amino-ethyl urea, 2-aminoethyl thiourea, 2-aminoethyl urethane, S-(2-hydroxyethyl)-thiourethane, O-(2-hydroxyethyl)-thiourethane, 2-hydroxyethyl sulphuric acid amide, guanyl ethanol, guanyl ethylamine, 2 - aminoethylguanidine, 2-mercaptopropionic acid amide, 2-mercaptoethyl sulphonamide, succinic acid monoamide, maleic acid monoamide, 2-carboxyethyl sulphonamide, 2-carboxyethylurea, 2 - carboxyethyl urethane, 2-guanyl propionic acid, 2-carboxyethyl guanidine, succinic acid monoureide, succinic acid diureide, fumaric acid diureide, malonic acid diureide, succinic acid diamide, amidosulphonyl propionic acid amide, 2-carbonamidoethyl urea, 2-carbonamidoethyl urethane, 2-carbonamidoethyl sulphuric acid amide, 2-guanyl propionamide, 2-carbonamidoethyl guanidine, succinic acid amide ureide, succinic acid dithioamide, succinic acid amidohydrazide, hydrazinocarbonylethyl urea, hydrazinocarbonylethyl urethane, amidosulphonylethyl urea, ethylene-bis-urea, carbamylethyl urea, guanylethyl urea, guanidinoethyl urea, ureidopropionic acid ureide, ethylene-bis-thiourea, 2 - hydrazinopropionamide, 2 - hydrazinoethyl urea, 2-hydrazinoethyl thiourea, 2-dihydrazinoethyl urethane, guanyl-ethyl hydrazine, 2-hydrazinoethyl guanidine, 2-hydrazinopropionic acid ureide, 3-hydroxymaleic acid monoamide, 3-hydroxypropyl urea, N,N'-bis-(3-hydroxypropyl)urea, N,N-bis-(3-hydroxypropyl)urea, N,N-bis-(3-hydroxypropyl)thiourea, 3-hydroxy-propylurethane, 3-hydroxypropylguanidine, leucine amide, isoleucine amide, 3-aminopropyl sulphonamide, 3-aminopropyl urea, 3-aminopropyl thiourea, 3-aminopropyl urethane, guanylpropylamine, 3-aminopropyl guanidine, 3-carboxypropyl urea, glutaric acid diamide, 3-carbonamidopropyl urea, 3-guanyl-butyramide, 3-carbonamidopropyl guanidine, trimethylene - bis-urea, trimethylene-bis-thiourea, 3 - hydrazinobutyramide, 3 - hydrazinopropylurea, 4-aminobutyric acid amide, 5 - aminovaleric acid amide, 6-amino-caproic acid amide, 11 - aminoundecanoic acid amide, 1,4 - tetramethylene-bis-urea, 1,6 - hexamethylene-bis-urea, 2,2 - dimethyl - 1,3 - trimethylene-bis-urea, malic acid diamide, aspartic acid diamide, citric acid diamide, the isomeric aminophthalic acid diamides and hydroxyphthalic acid diamides, citric acid diureides, amino-phthalic acid diureide, aspartic acid diureide, carbamic acid-2-hydroxyethyl ester, hydroxymethyl dicyandiamide, N,N'-hydroxyethyldicyandiamide, 6-methylaminocaproic acid amide, 6-aminocaproic acid amide, 6-aminocaproic acid methylamide, 6-methylaminocaproic acid methylamide, 6-aminocaproic acid ethanolamide, maleic acid bis-amide, phthalic acid bis-amide, isophthalic acid bis-amide, terephthalic acid bis-amide, hydroxyethoxypropionic acid amide, hydroxyhexyloxypropionic acid amide, 6-aminocaproic acid ureide, 11-aminoundecanoic acid ureide, p-aminobenzamide, p-aminobenzureide, and glutaric acid amide.

The above-mentioned compounds Y—X—NHR or Y—R$_2$—(X—NHR)$_n$ may either be used in quantities equivalent to the NCO groups present or in excess. A ratio of 1.0:1 to 2.5:1 and in particular 1.0:1 to 1.5:1 is preferred.

It may sometimes be desired, especially in view of a branched and, therefore, subsequently cross-linked molecular structure, to carry out the process below the equivalence and preferably in the equivalent ratio 0.6–1. In this procedure the NCO/OH-ratio may be higher than 2 and up to 3 when building up the prepolymer.

End groups of the formula —X—NHR are also formed by reacting prepolymers which have terminal NCO groups with ammonia or primary amines, for example with methylamine, ethylamine or ethanolamine. For this purpose, it is advantageous to introduce the amine component into the reaction vessel and then add the prepolymer. Alternatively the amine may be converted into the carbonate to reduce the reactivity. The reaction may be carried out in the presence of water.

Urea, thiourea, alkylene-bis-ureas, aminocarboxylic acid amides and ureides, imidazolidone and amino derivatives of triazine are particularly preferred for this purpose.

R is preferably a hydrogen atom, i.e. the compounds in question are preferably acyl derivatives of ammonia. Such end groups —X—NH$_2$ insure especially high reactivity with formaldehyde and reactive methylol compounds and their ethers, a factor which is especially important when preparing dispersions which undergo spontaneous cross-linking at room temperature or only slightly elevated temperature. Among the substituted ureas, imidazolidone (ethylene urea) and its derivatives are particularly reactive and therefore preferred.

Some of the compounds listed as anionic modification components are also suitable for use in the reaction with prepolymers which contain NCO groups, leading to formation of polyurethanes which carry end groups which are reactive with formaldehyde. These are usually compounds which contain at one and the same time a group which is reactive with NCO groups, and amide or ureide group and a carboxylic or sulphonic acid group, if desired in salt form.

The following are examples of these compounds: dihydroxymaleic acid monoamide, tartaric acid monoureide, citric acid mono and diamide; citric acid mono- and diureides, tartaric acid amide, asparagine, glutamine, aspartic acid monoureide, glutamic acid monoureide, ureidosuccinic acid, oxaluric acid, acetamide-C-sulphonic acid, acetyl urea-C-sulphonic acid, acetylguanidine-C-sulphonic acid, propionyl urea $\alpha$-sulphonic acid, propionamide $\alpha$-sulphonic acid, butyramide $\alpha$-sulphonic acid, isobutyramide $\alpha$-sulphonic acid, acetoguanamine sulphonic acid, N-methyl-asparagine, N-methyl-aspartic acid ureide, N-hydroxyethyl-asparagine, N-hydroxyethyl aspartic acid ureide, addition products of aminoamides or aminoureides with $\alpha,\beta$-unsaturated carboxylic acids, of aminocarboxylic or aminosulphonic acids with $\alpha,\beta$-unsaturated carboxylic acid amides or -ureides, N-carbonamido methyl glycine, N-carbonamidomethyl-6-aminohexanoic acid, N-carbonamidomethyl anthranilic acid, carboxylmethyl-aminoacetyl urea, addition products of sultones and $\beta$-lactones such as β-propiolactone with ureas and carbonamides such as 3-ureidopropane sulphonic acid, 3-ureidobutane sulphonic acid and 2-ureidopropionic acid.

It is as well possible to use addition products which are formed by an aminomethylation or sulfomethylation reaction to ureas or carbonamides. It is advantageous that the addition of sultones, lactones and carboxylic acid anhydrides as well as the aminomethylation and sulfomethylation can also be effected, before the dispersion process, on the polyurethane containing acylated amino end groups.

Analogously, the corresponding (potential) cationic compounds, e.g. α - dimethylamino-β-hydroxypropionamide, may also be used.

The end groups —X—NHR or —X—NH₂ can, of course, also be introduced in the polyurethanes in some other manner, for example by using poly(ester) amides which carry carbonamide or ureide groups entirely or partly in terminal positions, using in this case, less than the equivalent quantity of diisocyanate.

In another method, polyesters with terminal carboxyl groups or low molecular weight polycarboxylic acids are used as structural components. After reaction with less than equivalent quantities of polyisocyanate, a polyurethane with terminal carboxyl groups is obtained; these carboxyl groups are reacted with ammonia and heated so that they (partly) form acid amide groups in known manner.

In yet another method polyurethanes which have terminal tertiary amino groups are quaternized with an alkylating agent which contains an acylated amino group X—NHR. Polyurethanes with terminal sulphide groups can also be terminated in a corresponding manner with alkylating agents. The preparation of polyurethanes with terminal tertiary amino groups has been described, for example, in Belgian patent specification No. 636,799. To prepare such polyurethanes which have terminal tertiary amino groups, it is advantageous to react the corresponding NCO prepolymers with, for example, dimethyl aminoethanol, dimethyl aminopropanol, N,N-dimethylhydrazine, N,N - dimethylethylene diamine, N,N - dimethylaminopropylamine or N,N-dimethylaminohexylamine.

Suitable alkylating agents are, for example, chloroacetamide, bromoacetamide, N - methylchloroacetamide, β-bromopropionic acid amide, α-chloropropionic acid amide, α-bromopropionic acid amide, α-bromoisobutyric acid amide, m-chloromethylbenzamide, p-chloromethylbenzamide, p-chloromethylbenzamide, 4 - chloromethylphthalic acid diamide, α-bromosuccinic acid diamide, 2-chloro - 4,6 - diamino-s-triazine, 2 - chloro - 4 - methoxy-6 - amino-s-triazine, α-methylsulphonyl-hydroxy-succinic acid diamide, ethylsulphonyl hydroxyacetamide and chloroacetyl urea.

Polyurethanes which have terminal reactive halogen atoms, the preparation of which has been described, for example, in Belgian patent specification No. 636,799, can be quaternized similarly with tertiary aminoamides, e.g. with dimethylaminoacetamide, 2 - diethylaminopropionamide, dimethylamino succinic acid diamide, p-diethylaminomethyl benzamide, m-dimethyl-aminobenzamide, 2-dimethylaminopropionic acid amide or 2-dibutylaminopropionic acid amide.

In yet another method, polyurethanes which have been prepared in known manner, for example with terminal —OH, —SH, —NH₂ groups, can be converted into polyurethanes with terminal amide groups by addition of acrylamide or acrylonitrile followed by partial hydrolysis. The electrolyte-forming group is introduced at the same time by addition of, for example, maleamic acid or maleuric acid.

The addition of, for example, hydroxylamides, hydroxyalkyl ureas, mercaptoalkylamides, aminoalkylamides, or aminoalkylthioureas to terminal double bonds which are capable of addition reactions, such as those obtained by the incorporation of unsaturated dicarboxylic acids or glycols in the polyurethane, may also be used as a method for introducing terminal acylated amino groups.

The total quantity of acylated amino groups

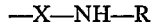
—X—NH—R may be greater than that of the end groups themselves because such groups can also be introduced by means of bifunctional chain lengthening agents, alkylating agents or neutralizing agents (acids or bases). The total quantity should, however, not exceed 400 milliequivalents percent and is preferably 20–120 milliequivalents percent.

By the term "terminal group" is meant a group which depending on the specific —X—NH—R used is linked only at one part to a relatively long radical, while R should not contain more than 4 carbon atoms.

—X—NH—R can therefore also be a side branch of such a main chain or the end group of such a side branch. A polyurethane molecule should, on an average, contain about 1.5 to 10 such terminal groups but preferably 2 to 5 such terminal groups.

The introduction into the polyurethane of terminal groups which are reactive with formaldehyde is carried out at temperatures between room temperature and about 190° C. Temperatures between 80 and 160° C. are preferred. At higher reaction temperatures, there is the risk of incipient decomposition of the polyurethane polyelectrolytes, whereas at lower temperatures stirring becomes more difficult. The selected reaction temperature also depends on the reactivity of the compounds which is added to the prepolymer to provide the end groups.

The reaction of a prepolymer which has free —NCO groups with, for example, 6-aminocaproic acid amide takes place sufficiently rapidly at 80° C. and below, whereas the reaction with urea requires temperatures above 120° C. In general, it is advantageous to operate at temperatures above the melting point of the added component if solubility is insufficient.

According to another embodiment of the process, prepolymers which carry free NCO groups and which contain 0.3–20 percent and preferably 0.8–10 percent of NCO are reacted with compounds which have at least one but preferably at least two free reactive methylol groups. Prepolymers which contain 1.5–6 percent of free NCO are particularly preferred.

These compounds which carry free methylol groups are, for example, the mono-, di- and oligomethylol compounds of the compounds Y—X—NHR or

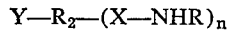
Y—R₂—(X—NHR)ₙ which have been defined above, methylol compounds of aliphatic and araliphatic ketones; nitriles or β-ketocarboxylic acid esters and quite generally of compounds which have CH acidic hydrogen atoms, as well as of phenols, di- and polycarboxylic acid amides and di- and oligourethanes. The one restriction on the compounds used for this purpose is that, to be for the reaction with NCO prepolymers, they must have at least one free methylol group left after the reaction with the isocyanate groups present.

The following are examples of suitable methylol compounds: dimethylol urea, tetramethylol urea, trimethylol melamine, tetramethylol melamine, pentamethylolmelamine, hexamethylolmelamine, tetramethylol hydrazodicarbonamide, dimethylol dicyandiamide, pentamethylol-4-ureido - 6 - methyl-hexahydropyrimidone, dimethylol-p-cresol, tetramethylolacetone, hexamethylol acetone, tetramethylol methylethylketone, pentamethylol methylethyl ketone, tetramethylol hexanone and dimethylolthiourea.

In addition, methylol compounds of the compounds already mentioned which carry end groups which are reactive with formaldehyde may be used.

Methylol-containing condensation products of urea formaldehyde, urea acetaldehyde-formaldehyde, urea furfurolformaldehyde, urea crotonaldehyde - formaldehyde and melamine formaldehyde may also be used. In general, many different methylol-containing phenol formaldehyde or amine formaldehyde condensation products such as those commonly described as phenol resins or amine resins and which are produced commercially may be used. Xylene-formaldehyde resins which contain methylol groups may also be used.

Low molecular weight polymers and copolymers based on acrylamide or methacrylamide and formaldehyde may also be used.

Any of the methylol compounds of di- and oligourethanes, such as those formed generally from polyisocyanates and alcohols, from polyisocyanates and polyalcohols or from monoisocyanates and polyalcohols, may be used. Examples of these are methylol compounds of the adducts of: 1,6-hexane diisocyanate and methanol, ethanol or propanol; 2,4-toluylene-diisocyanate, trimethylol propane, and methanol; triphenylmethane triisocyanate and methanol; pentaerythritol and methylisocyanate; and trimethylol propane and methoxymethyl isocyanate.

The methylol-containing substance which is used is generally nonionic and neutral in its electronic character. It is then reacted with an NCO prepolymer which itself has a (potentially) electrolytic character, for example by virtue of built-in cationic or anionic salt groups or the initial presence of basic amino groups, sulphide groups or carboxyl groups.

One may, however, also start with prepolymers which are free from ionic groups or potential ionic groups and react these prepolymers with methylol compounds which carry (potentially) ionic groups; in particular with those which carry basic amino, quaternary ammonium, carboxyl or sulphonic acid groups or their salts.

The following are examples of such compounds: methylol compounds of dihydroxymaleic acid monoamide, tartaric acid monoureide, citric acid mono- and diamide, citric acid mono- and diureide, tartaric acid amide, asparagine, glutamine, ureidosuccinic acid, succinic acid monoureide, maleamic acid, maleuric acid, acetyl urea C-sulphonic acid, N-hydroxyethyl asparagine, N-hydroxyethyl aspartic acid ureide, N-carbonamidomethyl glycine, sodium sulphomethyldicyandiamide, and methylol-containing aminoplast and phenolplast precondensates which have an electrolyte character due to the inclusion of (potentially) ionic components. These ionic components are generally used together with the usual components such as urea, melamine, cyanamide, dicyandiamide, phenol, cresol, aldehydes, and ketones are, for example, glycine, taurine, N,N-dimethylethylene diamine and chloroacetamide.

The methylol compounds may be used in quantities equivalent to the NCO groups present, i.e. one mol of methylol compounds to one NCO equivalent, but they also may be used in excess. Preferably, an equivalent ratio of 1.0 to 2.5 and especially 1.0 to 1.5 is used.

Methylol end groups can, of course, also be introduced in some other way, for example, by reacting polyurethanes which have terminal double bonds, epoxides, carboxyl or anhydride groups with the methylol compounds.

In another method, reacting polyurethanes which have reactive halogen atoms which are capable of quarternization are reacted with methylol compounds which contain tertiary amino groups. Conversely, polyurethanes which contain terminal amino groups, such as those described, for example, in Belgian patent specification No. 636,799 can also be reacted with quaternization with methylol compounds which carry reactive halogen atoms.

Suitable compounds with reactive halogen atoms, include the methylol compounds of the haloalkyl acid amides mentioned earlier. Suitable compounds with tertiary amine groups are, for example, the methylol compounds of the aminoamides mentioned earlier.

The polyurethane electrolytes may, of course, only contain a certain proportion of methylol groups in addition to acylated amino groups —X—NHR which are reactive with formaldehyde. Thus an amount of, on an average, about one reactive methylol group per molecule is often sufficient for subsequent chain lengthening. If one intends to carry out dispersion in the presence of formaldehyde, the amount may be still less.

The reaction of the starting components to convert them into (potential) polyurethane electrolytes, in particular the last stage, of the process (reaction of the NCO prepolymer with compounds Y—X—NH—R or

or their methylol compounds) can also be promoted by the addition of small quantities of solvents such as dimethyl formamide, diethyl formamide, ethylene glycol, diethylene glycol and their ethers and esters. The quantity of solvent thereby introduced should be not more than about 6 percent of the total amount of polyurethane dispersion. The quantity is, however, preferably only 0.2–2 percent. The use of solvents which have hydroxyl groups which are later built into the polyurethane under the action of the formaldehyde added is especially advantageous.

In the quaternization reaction of a potential polyurethane electrolyte which contains basic nitrogen atoms with chloroacetamide, sublimation of the amine on the cool parts of the reaction vessel may be prevented by the addition of, for example, 1–3 percent ethylene glycolmonomethylether acetate.

It should be emphasized, however, that the process according to the invention is preferably carried out without organic solvent. The special advantage of the process according to the invention compared with prior art processes is that the use of an organic solvent to obtain polyurethanes from aqueous dispersion can be completely dispensed with without any disadvantages being incurred. In addition the dispersions formed do not have to be subjected to a distillation process and do not require any special precautions on account of the presence of residual quantities of solvent. One may, of course, use water as solvent even at this stage of the reaction.

The absence of organic solvents in the process according to the invention is possible because in contrast to the prior art processes, low molecular weight polyurethanes which are free from NCO groups are dispersed by mixing with water. A chain lengthening reaction occurs only during, or some time after, dispersion, being brought about by heat treatment and if desired by lowering of the pH. This reaction may lead either to the formation of a thermoplastic resin or to the formation of a high molecular weight resin which may be cross-linked to a greater or less extent. This chain lengthening reaction to form the high molecular weight polymer takes place without substantial increase of viscosity in the aqueous binary system and/or only later, during shaping.

When synthesizing potentially cationic polyurethanes with built-in tertiary amino groups, one can usually dispense with compounds which catalyze the reaction with isocyanates. The use of a catalyst may be advantageous when synthesizing sulphonium polyurethanes or polyurethanes which carry anionic groups. Tertiary amines and organometallic compounds, e.g. tributylamine, diazabicyclooctane, pyridine, tin octoate, dibutyl tin dilaurate, zinc octoate, cobalt naphthenate and iron acetyl acetonate are especially advantageous for such a purpose.

Polyurethane polyelectrolytes which contain groups that are reactive with formaldehyde and which according to the invention are converted with formaldehyde-containing solutions into methylol-containing polyurethane polyelectrolytes during or immediately before dispersion should have an average molecular weight of less than 25,000 and preferably between 2,000 and 10,000.

Polyurethane polyelectrolytes having molecular weights between 3,000 and 8,000 are especially preferred. In addition, they should no longer contain any free NCO groups. The average molecular weight is difficult to determine exactly but can be estimated with sufficient accuracy, for example, by group determination and osmometric measurements. In many cases the approximate average molecular weight can be determined from the stoichemistry of the reactants employed for the synthesis of the polyurethane.

If, for example, 2 mols of a dihydroxy compound of molecular weight 2,000, 1 mol of a basic chain lengthening agent of molecular weight 119, 4.75 mols of diisocyanate (molecular weight 168) and 3.5 mols of urea (molecular weight 60) are reacted together to produce a polyurethane with 2 terminal biuret groups, then the molecular weight is calculated to be:

$$xMW = 2/3.5 \cdot (2 \times 2,000 - 119 - 4.75 \times 168 - 3.5 \times 60) \approx 3000$$

This calculated molecular weight is almost invariably below 10,000 and is usually below 8,000.

Another important factor in practice is that the viscosity at 120° C. should be less than 1500 poises. The viscosity is preferably between 50 and 1,000 poises. At higher viscosities, admixture of aqueous formaldehyde-containing solutions is difficult and requires the use of special apparatus such as internal mixers, mixing screws or slowly rotating spiral stirrers. In addition there is the risk of premature increase in molecular size in the stages up to chain lengthening, before the process of dispersion is completed. If no suitable measuring apparatus is available, one can take as a general guide the fact that the reaction mass should be sufficiently stirrable in a 3 liter glass beaker at 120° C. using an ordinary horseshoe mixer at 50–200 revs./min.

Products which have viscosities below 50 and especially those with viscosities below 10 are of little practical interest because the properties of the end products render them of little use.

It should be noted that in the polyurethane polyelectrolytes used according to the invention which contain end groups which are reactive with formaldehyde, there is no fixed relationship between viscosity and molecular weight. However, for a given definite chemical composition the viscosity increases with the molecular weight. The viscosity is much more influenced by the chemical character of the polyurethane and in particular the amount and sequence of ionic groups and groups capable of hydrogen bond formation.

The polyurethane electrolytes which contain terminal groups which are reactive with formaldehyde preferably have a salt group content of 4–120 milliequivalents percent. This means that for an average molecular weight of 2,500 at least every tenth molecule incorporated carries a salt group. These portions of the polyurethanes which carry salt groups then act as emulsifiers for the non-ionic portions. Salt groups of various types of chemical constitution may be used.

The following are the most commonly used groups:

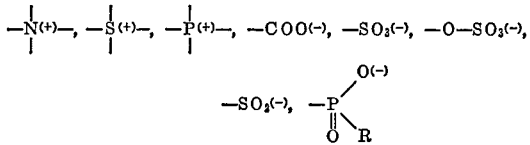

The same applies to polyurethane electrolytes which carry methylol groups.

The polyurethanes need not already be present in the salt form before addition of the aqueous solution which contains formaldehyde. Instead, these groups may be present in a potential form, i.e. as groups which are capable of salt formation. This is especially advantageous if salt formation takes place by simple neutralization in the presence of water.

The following are examples of groups which are capable of salt formation (potential electrolyte groups):

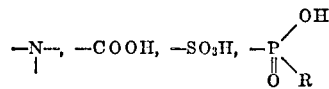

Since salt formation in an anhydrous medium is usually associated with a high increase in viscosity, it may be advantageous, especially in the case of those polyurethanes which are in any case highly viscous, to carry out salt formation with acids or bases only during the addition of water.

Salt groups and groups capable of salt formation may, of course, also be present at the same time.

In order to achieve satisfactory dispersion as well as satisfactory properties in the end products, it is also necessary that the (potential) polyurethane electrolytes should have hydrophobic chain segments of at least 60 chain members. By "hydrophobic chain segments" are meant segments which contain neither salt groups nor groups capable of salt formation which are converted into salt groups in the course of the process. These hydrophobic segments are advantageously polyether, polyester, polythioether or polyacetal segments which may also be interrupted by longer hydrocarbon radicals or urethane or urea groups. Those polyurethanes in which these hydrophobic segments consist of 250–400 chain members and only contain small number (e.g. 4–10) urethane or urea groups, are particularly preferred.

According to a preferred embodiment of the process, water together with formaldehyde and if desired together with acids or bases for neutralization, potential salt groups are stirred at elevated temperatures into the (potential) polyurethane electrolyte which have terminal reactive acylated amino groups.

According to a further preferred embodiment of the process, water is first added to the polyurethane mass until it appears cloudy. This quantity of water may contain the quantities of bases or acids required for neutralization of acid or basic groups. This first quantity of water amounts to about one tenth to one quarter of the weight of the polyurethane mass. The temperature is preferably between 50 and 100° C. Aqueous formaldehyde is then added within the same temperature range, followed by water. During the addition of water, the temperature may be 150° C. If desired, this operation may be carried out under pressure.

The necessary quantity of formaldehyde may also be dissolved in the total amount of water required for dispersion, and this formaldehyde solution may be added gradually.

Alternatively, a concentrated solution or suspension containing formaldehyde may first be added to the polyurethane melt (e.g. a suspension of paraformaldehyde in a little water), and the resulting polyurethane mass may then be dispersed by admixture of water. Paraformaldehyde or compounds which give off formaldehyde may also be added in succession to the reaction mass, in which case an aqueous solution which contains formaldehyde is formed in situ.

It is also possible to predisperse the polyurethane electrolytes having terminal reactive acylated amino groups with water and to add, in the last reaction step, formaldehyde in free or dissolved or chemically bonded form. This method of working is especially advantageous if, during the dispersion process, pH-values below 4 or above 9 must be applied and there is a danger of a premature polycondensation during the dispersion process.

The only essential condition to be observed in this embodiment of the invention is that at least some portions of water added should contain formaldehyde.

Instead of free formaldehyde, aqueous solutions of substances which give off formaldehyde, especially solutions of paraformaldehyde, trioxane, methylal, hexamethylene tetramine, oligo-methylol compounds such as di- and oligomethylol ureas, -hexahydropyrimidinones, -urones, -melamines and other triazine derivatives may be used. Methylol ethers may also be used, provided that they are used together with acid catalysts and therefore exist partly as free methylol compounds or free formaldehyde.

above 50° C. The length of time depends on the temperature and on the pH. At pH values of 5 to 7 and temperatures of about 50 to 80° C. the heat treatment does not need to last more than 10 to 48 hours. However, at 140° C. and a pH of 2, ten minutes may be sufficient. At temperatures above 120° C., it is preferable to work in a pressure vessel.

According to a further preferred embodiment, the resulting dispersion is stirred for 1 to 4 hours at a reaction temperature of 90–110° C. immediately after it has been produced. The resulting after-reaction is strongly accelerated by lowering the pH to 5 to 2 (preferably 4 to 3), for example by the addition of tartaric acid or phosphoric acid.

This after treatment is necessary especially if the dispersion is dried at room temperature and if after heating is not possible, for example in the cases of paints applied to buildings.

In addition to or instead of this step, the dispersion may also be dried at an elevated temperature. Temperatures below 100° C. are preferred for this purpose owing to the risk of bubble formation. The dispersions are in most cases first adjusted to pH 5 to 2 (preferably 4 to 3) if one does not wish to carry out after heating at higher temperatures. This method should be used, in particular, in the production of continuous coatings, backings, bonds and lacquers where drying is carried out fairly rapidly in a drying channel.

In addition to or instead of the these measures, the partial or completely dried products may also be after heated, e.g. after shaping. In such a case, the finished coatings, lacquers etc. are heated to temperatures between 50 and 200° C. (preferably 70–150° C.) and left at this temperature for some time. The drying temperature of the surroundings may be higher in the case of a quick drying operation, but the temperature of the polyurethane should not exceed 200° C. At this temperature, a drying time of 30 seconds may be sufficient, although at 100° C., the after heating time may rise to 1 to 4 hours. The resulting aqueous dispersions may be liquid or pasty in consistency and are stable without the addition of emulsifiers. However, suitable cationic, anionic or neutral emulsifiers and protective colloids may be added, such as the casein which has been decomposed by acid or ammonia, soaps, invert soaps, alkyl sulphonates, polyvinyl alcohol, hydroxy-ethylated phenols, oleyl alcohol, polyglycol ethers, hydroxyethylated polypropylene glycol or natural products such as gelatine, gum arabic; tragacanth or fish glue. Such additives serve mainly to lower the relatively high surface tension of the polyurethane dispersions. They also influence the chemical stability and the coagulability of the dispersions. The dispersions may be blended with dispersions of equal charge such as polyvinyl acetate, or dispersions of polyethylene, polystyrene, polybutadiene, polyvinyl chloride and copolymer resins.

Lastly, fillers, plasticizers, pigment, carbon black and silicic acid and dispersions of aluminum, clay or asbestos may be worked into the dispersions.

In many cases it is of advantage to incorporate the fillers, plastisizers, pigments, stabilizers e.g. against the influence of light or hydrolyzing influences, cross-linking agents, optical brighteners, agents effecting thixotropy, agents for improving the surface properties and the hand of e.g. coatings in substance, in dissolved, suspended or dispersed form, before the addition of water, into the melt of the polyurethane or to the concentrated aqueous solution of the polyurethane polyelectrolyte present before the dispersion process.

The dispersions of the polyurethane masses in water are stable and can be stored and transported and can be worked up at any later date, e.g. by a shaping process. They generally dry quickly to form dimensionally stable synthetic resin coatings, but shaping of the products can also be carried out in the presence of known cross-linking agents. For this purpose, polyfunctional substances which have a cross-linking action and which cause chemical cross-linking after the solvent, if present, has been evaporated at room temperature or elevated temperature, are added to the polyurethane masses in the course of the process. Examples of these substances are sulphur, sulphur sols, free and partially or completely masked polyisocyanates, carbodiimides, polyamides, primary monoamines and ammonia and organic and inorganic peroxides. The cross-linking agents, fillers, pigments, blending agents and other additives which may be present in solutions or suspension may be added to the dispersed polyurethane masses in the course of the process. Formaldehyde and/or higher aldehydes or their reactive derivatives and condensates, e.g. with amines and carbonic acid derivatives, or di- and polyepoxides may be added afresh to the dispersion already formed. The acylated amines Y—X—NHR or Y—$R_2$—(X—NH—R)$_n$ which have already been mentioned and which act as cross-linking agents for the methylol compounds present are of special importance as additive components. These acylated amines may be added at any stage during the synthesis of the polyurethane mass or the dispersion thereof or even only shortly before application of the product.

Free polyisocyanates which have a molecular weight of between 110 and about 4,000, on the other hand, must not be added until just before dispersion and preferably only after dispersion has occurred. They may also be added to the finished dispersion.

Polyurethanes with different properties are obtained depending upon the chemical composition of the product and the amount of urethane groups and ionic groups present. Thus soft, sticky masses, thermoplastic and rubbery elastic products with different degrees of hardness up to glassy duroplasts may be obtained. The hydrophilic character of the products may also vary within wide limits. The elastic products may also be worked up thermoplastically for example, at 100 to 180° C., provided they have not been produced with the addition of cross-linking agent. Small quantities of plasticizers or swelling agents such as polyesters, polyethers, phthalates or phosphates or even water, are advantageously added for this purpose.

Coagulates which are obtained, for example, by freezing the dispersions or by the addition of electrolyte can be converted into thin sheets, e.g. by pressing and drying, and these sheets can then be further processed by the usual methods. In some cases, aqueous dispersions may also be atomized to form powders which can be sintered and melted.

If the dispersions can sediment and be redispersed, the finely divided polyurethane may also be simply removed by filtration under suction. The resulting pastes or powders can be solidified by melt sintering. Lastly, the products may be after treated with aqueous solutions of polyvalent anions, e.g. of sulphate disulphonate, phosphate, silicofluoride or phosphate, to improve their properties, for example to increase the hydrophilic and lyophobic properties and their surface hardness.

The polyurethanes obtainable by the process according to the invention can be used in many different ways.

Thus they can be used for producing dip molded articles and foams by the latex foam heating process. They can be used to form coagulates by the addition of electrolyte to the aqueous solutions and dispersion, and these coagulates can be worked up on mixing rollers both sticky and nonsticky films and foils being obtained by evaporation of the water. The products of the process are suitable for use in the production of coatings and coverings and for impregnating woven and nonwoven textiles, leather, paper, wood, metals, ceramics, stone, concrete, bitumen, hardboard, straw, glass, procelain, all sorts of synthetic resins, glass fibers, for production of antistatic The following are examples of methylol compounds which may be used: dimethylol urea, hexamethylol melamine, hexamethylol-melamine methyl ether, tetramethylol acetone, hexamethylol acetone, methylol compounds and methylol ethers of urea, ethylene urea, methylene diurea, biuret, carbonyldiurea, hexamethylene diurea, acetylene diurea, hydrazodicarbonamide, tetrahydropyrimidinone, tetrahydro-1,3,5-oxadiazinone-(4), dicyandiamide, acrylamide polymers and methacrylamide polymers, formaguanamine, acetoguanamine and benzoguanamine.

In addition to formaldehyde, higher aldehydes such as acetaldehyde, chloral, crotonaldehyde, acrolein, furfural, glyoxal and glutaric dialdehyde, ketones such as acetone, methylethyl ketone and cyclohexanone, and their condensates with compounds which form aminoplasts or mixed condensates with formaldehyde and compounds which form aminoplasts, may be used.

In all cases, in order to insure that reaction with the reactive groups —X—NHR occurs, the aqueous solutions of such formaldehyde derivatives should contain free formaldehyde in equilibrium under the reaction conditions. It is not necessary, however, for this reaction to produce exclusively the methylol-containing groups

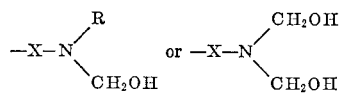

It is possible, within the scope of the invention, for new methylol compounds

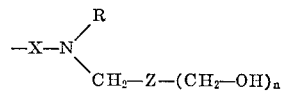

to be produced by reaction of the reactive groups —X—NHR with oligomethylod compounds

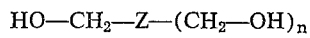

in which Z is, for example, a radical which is difunctional to hexafunctional towards formaldehyde and $n$ is an integer from 1–5.

Further condensation in which the methylol compounds undergo substantially complete reaction, on the other hand, must definitely be avoided before formation of the dispersion. This is achieved by carrying out the mixing of the polyurethane mass with the formaldehyde containing aqueous solutions at pH values of preferably between 9 and 4.1 and especially between 7.5 and 5.5. Furthermore, the stages in the process of the invention between the mixing process and the formation of the dispersion should generally not take longer than about two hours.

The quantity of formaldehyde required, in free or bound form, depends on the quantity of reactive —X—NHR groups present, taking into consideration also the reactive —X—NHR groups present within the chain, for example when tertiary nitrogen has been quaternized with chloroacetamide. The equivalent ratio of —X—NHR to formaldehyde (based on the free formaldehyde) lies between 1:0.3 and 1:4, in particular between 1:2 and 1:0.6. Smaller quantities of formaldehyde are disadvantageous because chain lengthening then does not take place to a sufficient extent even if the conditions are suitable for adequate dispersion. Larger quantities of formaldehyde are generally of no advantage but produce a strong smell in the dispersion and lead to the release of large quantities of formaldehyde during drying.

Larger quantities of formaldehyde should, however, be used, if in the course of the process or before application of the product, additives which are capable of reacting with formaldehyde, e.g. urea, methylene-bis-urea, polyureas, melamine or guanamine, urea-melamine resins or urea-phenol resins are added to modify the properties of the dispersion.

Catalysts such as sodium carbonate, potassium carbonate, ammonia or urotropine may be added to accelerate the reaction between the terminal acylated amino groups and the dissolved formaldehyde. The quantity of catalysts should, however, be kept small, especially in the case of cationic products, in order that the stability of the dispersions produced should not be impaired.

The quantity of water required depends mainly on the concentration at which the paste of water in polyurethane which is first formed changed over into a polyurethane/water dispersion. While this may occur at polyurethane concentrations of about 68 percent, in some cases it may not occur until the concentration is 20 percent. The total quantity of water required thus amounts to 0.5 to 4 times, and preferably 0.8 to 3 times, the quantity of polyurethane.

The water should be added at such a rate that it will be taken up evenly by the polyurethane mass. The mixing process may generally be carried out satisfactorily in the usual stirrer apparatus or stirring tanks with slowly rotating horseshoe stirrers, provided that the stirring is sufficiently efficient for the high viscosities which occur. Stirrer mechanisms which at the same time also insure thorough mixing of the material in a vertical direction, e.g. spiral stirrers, are especially suitable. High speed stirrers are generally less suitable.

If the polyurethane mass already contains terminal methylol groups, for example due to reaction of a prepolymer which carries NCO end groups with oligomethylol compounds, the presence of formaldehyde during the dispersing process is not necessary. In such cases, water, if desired together with the quantities of acids or bases required for neutralization of the potential salt groups, is stirred into the (potential) polyurethane electrolytes which contain terminal reactive methylol groups.

The spontaneous dispersion of the polyurethane which then takes place is brought about by the combined action of the built-in ionic groups and the terminal methylol groups.

In general, the water is first taken up with formation of an almost clear solution. With progressive addition of water, a milky white paste is formed which contains the water partly in solution and partly dispersed in the polyurethane (water-in-oil type of dispersion). With further addition of water, the paste changes into a polyurethane-in-water dispersion. In some cases, this transition only takes place on cooling the dispersion.

The temperature during the addition of water lies between room temperature and 150° C., and preferably between 50 and 130° C. One may, for example, stir in approximately the first half of the water at temperatures between 80 and 130° C. and then add more water with cooling. According to a particularly preferred procedure, the total quantity of water up to formation of the polyurethane-in-water dispersion is added at temperatures of about 100° C. At temperatures above 130° C., it is advantageous to work under excess pressure.

If the entire process for the production of the polyurethane mass, or even only the dispersion process, is to be carried out continuously, one may use a special screw apparatus.

If the resulting dispersion is cooled immediately after it has been produced and is then dried at room temperature, the properties of the product are not satisfactory. Strength and water resistance are low. In order to obtain properties which are satisfactory for commercial purposes, heat treatment of the products is necessary. This may be carried out before and/or during and/or after shaping of the dispersion. Shaping may be carried out, for example, with simultaneous drying of the products by removal of water. The products can also be produced by a process of coagulation, for example by electrophoretic deposition on an electrode.

In heat treatment before removal of the water from the dispersion, the resulting dispersion is exposed for some time, e.g. for 10 minutes to 48 hours, to a temperature and increase resistance finishes, as binders for fleeces, adhesives, bonding agents, backing agents, agents for rendering substances hydrophobic, plasticizers, binder, e.g. for cork powder or saw-dust, glass fibers, asbestos, paper-type materials, plastics or rubber waste, ceramic materials, as auxiliary agents in textile printing and in the paper industry, as additives for polymers, as sizing agents and for finishing leather.

Powders or pastes which are obtained from suspension can be used as additives to polymers such as polyvinyl chloride, polyvinyl acetate or styrene-butadiene copolymers. The powder may, for example, be added to the polymers which are in the solid or molten form, on mixing rollers or in an extruder.

Alternatively, the products of this invention may, for example, be stirred into polymer dispersions or suspensions. The properties of the polymers can be significantly improved by the addition of the polyurethane micro powders.

Polyurethane powders can also be used as high grade fillers for epoxide and polyester resins, the flexibility and elasticity of which can be improved. They are also suitable for use as solvent-resistant binders, in which case the fibers may be of natural origin (cotton, wool) or synthetic origin (rayon, polyamide, polyacrylonitrile). Inorganic fillers (glass, asbestos) may also be bonded with these binders.

Other uses arise from their ability to serve as adhesives, as additives to dyes and lacquers to improve their abrasion resistance, and as lubricant additives. The polyurethanes present in the form of dispersions are also suitable for use as emulsifiers for the preparation of polymer dispersions, e.g. of polymer dispersions from nonionic polyurethanes. Sedimenting dispersions or suspensions, pastes and powders prepared from them are especially suitable for use in the production of microporous sheets.

A great advantage of these dispersions over products of known processes for the production of microporous sheets is that in the production of the products of the process, shaping can be carried out by conventional industrial methods and using conventional machines. The dispersions described above can be applied particularly easily as 30 to 70 percent pastes by pouring or application with a wiper apparatus. Conversion into the paste form, if desired by means of the usual commercial thickeners, which are advantageously added in quantities of 1 to 10 percent to adjust the paste to the desired viscosity, reduces the sedimentation rate, according to the concentration, and causes smooth, uniform flow of the masses. Highly concentrated pastes having a solids content of about 50 to 70 percent can be kept for days without phase separation.

The suspensions or pastes are preferably applied to a porous support which then remains bonded to the finished product, e.g. woven or nonwoven textiles or fibers mats, felts, fleeces, including paper fleeces, foam resin foils or split leather, which bring about immediate solidfication of the coating of gel particles by their suction effect. The product is then dried at elevated temperature and pressed, if desired, causing solidification of the globular structure of the coating. Alternatively, drying may be carried out on smooth, porous or nonporous materials, e.g. metal, glass, cardboard, ceramic materials, sheet steel, silicone rubber or aluminium foil, and the finished sheeting can then be lifted off and used as such or applied to a substrate, generally a porous substrate, by the reversing process by bonding with adhesive, flame backing or calendering. The application by the reversing process may be carried out at any time.

The properties of the products can be modified by the inclusion of active or inactive fillers, for example, polyethylene, polypropylene, polyvinyl acetate, ethylene-vinyl acetate copolymers which may be (partly) saponified and/or grafted with vinyl chloride, styrene-butadiene copolymers, ethylene (graft) copolymers, carbon black, silicic acid, asbestos, talcum, kaolin, titanium dioxide, glass in the form of powder or fibers or cellulose. The end product may contain up to 70 percent of such fillers, based on the total weight of dry substance, depending on the desired properties of the products and purposes for which they are to be used.

The addition of these substances, may be carried out at various stages during the production of the dispersions and in various forms. The polymers may already be included during the preparation of the polyurethane dispersions, although they may also be added to the finished polyurethane suspensions or to pastes or powders produced therefrom, in the form of their aqueous emulsions or suspensions, or as powders, so that they act as fillers.

Dyes, pigments, plasticizers or additives which affect the flow properties may, of course, also be added.

Drying of the products obtained by various methods of application can be carried out at room temperature or elevated temperature, although melting or fusing of the material should not occur. The drying temperature to be selected in any individual case, which depends on the chemical composition of the material and, in particular, its moisture content, the drying time and the layer thickness, can easily be determined by preliminary tests. For a given heating time, the drying temperature must always be below the solidification temperature (see below). The material must on no account become transparent during drying.

If drying is carried out at temperatures between 10 and 40° C., solidification of the material generally does not take place. The sheets obtained can generally be crumbled by hand and in many cases they are even redispersible.

Solidification is carried out by the application of elevated temperatures, preferably between 50 and 180° C., the particles at the same time undergoing sintering with mechanical intermeshing or partial fusion of the boundary surface as a chemical cross-linking reaction taking place between the boundary surfaces of the particles. Further excessive sintering or complete fusion is prevented by the cross-linking of the boundary zones, so that the whole material remains permeated by extremely fine ducts.

Drying and solidification can be carried out simultaneously or successively. The solidification temperature of predried layers is about 10–30° C. higher than that of moist sheets. The solidification temperature has to be increased with decreasing water content in order to achieve comparable results. The length of time for which the foil material should be exposed to the elevated temperature, the thickness of the foil and the pressure applied, if desired, for example, by hot rollers used for solidification, are other important factors which strongly influence the microporosity, permeability to water vapor and physical properties of the products according to the invention.

Sheets measuring 100 to 400$\mu$ in thickness can be sintered by short exposure to elevated temperatures, for example, for a few seconds, in the case of foils which are substantially free from water, to a few minutes in the case of sheets which are still slightly moist. The temperature employed here may be considerably above the solidification temperature otherwise required for longer drying times.

The finished sheets according to the invention are milky and opaque or even as is usual, completely white having a warm, pleasant hand, good tensile strength and low abrasion. They are insoluble in solvents, and are frequently even insoluble in hot dimethylformamide. The permeability to water vapor is distinctly higher than that of the corresponding homogeneous materials and in most cases corresponds to that of natural leather.

A distinct morphological structure can be seen under the optical microscope.

The sheets can then be covered with a finish to increase the resistance of their surface. Aqueous dispersions and solutions are again preferred for this purpose.

The products of the process can be used in many different ways, e.g. as coatings of all types which are permeable to air and water vapor, and as damping materials for absorbing sound and mechanical vibrations.

For example, tent sheets, rain coats, bags, belts, shoes, upholstery material, car linings, and wall papers can be produced from these sheet materials.

Very hard polyurethanes obtained from dispersions with very small particles and sols are suitable for use as stoving lacquers and in some cases even as air drying lacquers. They combine the properties of great hardness and elasticity with high gloss and, when used with aliphatic diisocyanates, good stability to light and weathering.

The invention will be further illustrated by the following examples in which parts are by weight unless otherwise specified.

EXAMPLE 1

Reactants 500 parts (0.303 mol) of a polyester of phthalic acid, adipic acid and ethylene glycol (1:1:2.3), molecular weight 1650 (PEP)
50 parts (0.420 mol) of N-methyldiethanolamine (MDA)
52 parts (0.870 mol) urea (U)
201 parts (1.158 mol) of toluylene diisocyanate, isomeric ratio 65:35 (T 65)
39 parts (0.420 mol) chloroacetamide
258 parts by volume (2.5 mol) 30 percent aqueous formaldehyde
30 parts by volume ethylene glycolmonoethyl ether acetate (GMA)
1150 parts by volume water Method PEP, MDA and U are introduced into the reaction vessel at about 60° C. and T 65 is added within about 1 minute. The temperature rises to about 111° C., and at the same time there is a sharp increase in viscosity. When the reaction mixture has been heated to about 120° C., the temperature spontaneously rises to about 133° C. (urea reaction). The chloroacetamide is then added and washed down with GMA. The temperature is then kept for a further 10 minutes at about 130° C., the reaction mixture is left to cool to about 100° C. About 1,000 parts by volume of water are added dropwise within about 45 minutes, the temperature being meanwhile kept at 100–110° C. An opaque, thick sol is obtained which after cooling for about 20 minutes yields a liquid, slightly yellow, 41.5 percent latex of low viscosity. The particles are predominantly spherical, having a diameter between 50 and 120 m$\mu$.

Part of the dispersion is adjusted to pH 2–3 with tartaric acid.

About 10 parts samples of the original dispersion (pH 5–6) and of the acidified dispersion are dissolved in about 25 parts by volume of tetrahydrofuran at intervals of several days, and the outflow viscosity from a 2 ml. pipette which has been cut off at the bottom is measured in seconds.

| | After | | | | |
|---|---|---|---|---|---|
| | 0 days | 3 days | 10 days | 21 days | 45 days |
| pH 5–6, seconds | 0.6 | 0.8 | 1.2 | 1.2 | 1.0 |
| pH 2–3, seconds | 0.6 | 1.0 | 2.5 | 5.0 | 5.0 |

Slightly yellowish, elastic, fairly hard foils are obtained on drying the acidified dispersions.

EXAMPLE 2

Reactants and method as above, except that only 86 parts by volume (0.85 mol) of 30 percent aqueous formaldehyde and about 900 parts by volume water are used.

The viscous dispersion obtained after the addition of water thickens when cooled with stirring. The dispersion has a concentration of 46 percent. The primary particles are spherical with diameters between 200 and 500 m$\mu$. They are largely combined into aggregates of 3–6 primary particles each.

Molecular weight increase on storage (see above experiment):

| | After | | | |
|---|---|---|---|---|
| | 0 days | 7 days | 18 days | 42 days |
| pH 5–6, seconds | 1.2 | 1.2 | 1.6 | [1] 1.7 |
| pH 2–3, seconds | 1.3 | 2.3 | 4.2 | 39.5 |

[1] Cloudy.

EXAMPLE 3

Reactants 500 parts (0.303 mol) polyester of phthalic acid, adipic acid and ethylene glycol (1:1:2.3), molecular weight 1650 (PEP)
50 parts (0.420 mol) of N-methyldiethanolamine (MDA)
52 parts (0.870 mol) urea
194.5 parts (1.158 mol) 1,6-hexanediisocyanate
19.6 parts (0.21 mol) chloroacetamide
12.6 parts (0.21 mol) acetic acid
129 parts by volume (1.25 mol) 30 percent aqueous formaldehyde
30 parts by volume ethyl glycolmonomethyl ether acetate
1400 parts by volume water Method The same as in Example 1, the acetic acid being added together with the first portion of water. An opaque, 32 percent sol was obtained, pH=5. Samples of the original dispersion and of a dispersion which had been adjusted to pH 2–3 with tartaric acid are dried at room temperature for about 24 hours and for half an hour at about 80° C., and then treated with distilled water. For results see table.

| | After 1 hour's treatment with water | After 24 hours' treatment with water |
|---|---|---|
| pH 5, 24 hours at room temperature | Dissolved | Dissolved. |
| pH 2–3, 24 hours at room temperature | Unchanged | Clear, swelled. |
| pH 5, 30' at 80° C | White bloom | Heavy white bloom. |
| pH 2–3, 30' at 80° C | Unchanged | Clear, slightly swelled. |

EXAMPLE 4

Reactants 500 parts (0.303 mol) of a polyester of phthalic acid, adipic acid and ethylene glycol (1:1:2.3) molecular weight 1650 (PEP)
15 parts (0.126 mol) MDA
26 parts (0.428 mol) urea
108 parts (0.643 mol) 1,6-hexanediisocyanate
7 parts (0.075 mol) chloroacetamide
3 parts (0.061 mole) acetic acid
129 parts by volume (1.25 mol) 30 percent aqueous formaldehyde
30 parts by volume ethylene glycol monomethylether acetate
830 parts by volume water Method As in Example 3. After the addition of water at 130° C., a coarse particled latex is obtained which becomes thicker on cooling and shows rheopectic characteristics. Yield 1700 parts, solids 40 percent, pH 5–6.

The foils which are obtained by drying at room temperature the dispersions, acidified to pH 2–3, are clear, glossy and soft and have good water resistance. The properties are substantially improved by after-heating at 120° C.

EXAMPLE 5

Reactants 500 parts (0.37 mol) of a polyester of phthalic acid and ethylene glycol (molecular weight 1350)
30 parts (0.252 mol) MDA
60 parts (1.000 mol) urea
188 parts (1.122 mol) of 1,6-hexanediisocyanate
21 parts (0.224 mol) chloroacetamide
1.7 parts (0.028 mol) acetic acid
129 parts by volume (1.25 mol) 30 percent aqueous formaldehyde
680 parts by volume water
20 parts by volume ethylene glycol monomethyl ether acetate (GMA)

Polyester, MDA and urea are introduced into the reaction vessel at about 85° C. and 1,6-hexanediisocyanate is rapidly added. The reaction starts after two minutes. The temperature is prevented from rising above about 150° C. by cooling. Solid chloroacetamide is added at about 130° C. to the very viscous mass, and washed down with GMA. The reaction mixture is then stirred for about 30 minutes at about 130° C. and a solution of acetic acid in about 80 parts by volume of water is added dropwise in the course of about 13 minutes to the highly viscous, clear melt, the melt remaining clear. The formaldehyde solution is then added dropwise at about 90° C. in the course of about 20 minutes and the remaining water is then added dropwise in the course of about 50 minutes at about 130° C. A relatively coarse disperse thick liquid latex is obtained; the viscosity of the latex decrease on cooling. The concentration of the dispersion is 52 percent, pH 5–6.

If the acidified latex is painted on wood or glass, high-gloss, clear, colorless lacquer coats are obtained. After a heat treatment at 80° C. they are very hard and resistant to wear.

EXAMPLE 6

Reactants 500 parts (0.281 mole) of a polyester of phthalic acid and ethylene glycol (molecular weight 1350)
52 parts (0.780 mol) urea
190.5 parts (1.136 mol) of 1,6-hexanediisocyanate
53.5 parts (0.278 mol) of citric acid
29.2 parts (0.278 mol) of diethanolamine
64.5 parts by volume (0.63 mol) of 30 percent aqueous formaldehyde
1080 parts by volume water The diisocyanate is added to the polyester and urea at about 75° C. and the mixture is heated. An exothermic reaction sets in at about 130° C. and the temperature rises to about 151° C. After the reaction has died down citric acid at about 120° is added. A vigorous reaction immediately sets in, the reaction mixture becoming yellow and undergoing foaming. The temperature first drops to about 90° C. and then rises to about 120° C. A solution of diethanolamine in about 80 parts by volume of water is then added over a period of 3 minutes, followed by the addition of about 64.5 parts by volume of aqueous formaldehyde over a period of about 4 minutes, and this in turn is followed by the addition of about 750 parts by volume of water over a period of about 15 minutes. All these substances are added at about 100° C. A further 250 parts by volume of water are then added at about 130° C. over a period of about 23 minutes. After cooling, a white, viscous latex which shows slightly rheopectic properties and which has a good consistency for painting is obtained.

The latex is painted on a textile support and dried. After a heat treatment of 100–120° C., the coating is resistant to water and organic solvents.

EXAMPLE 7

The same procedure is employed as in Example 3 but only using 32.25 parts by volume of 30 percent aqueous formaldeyhde.

The resulting latex is very finely divided, thick and slightly thixotropic. After acidification to pH 3, soft, slightly sticky thermoplastic foils are obtained on drying at about 80° C. The latex is suitable for use as an adhesive.

EXAMPLE 8

The same procedure was employed as in Example 3 but using about 41 parts of thiourea instead of the urea, and about 64.5 parts by volume of 30 percent aqueous formaldehyde. A highly fluid, yellow latex which showed no Tyndall effect was obtained. After acidification with tartaric acid to pH 2–3, pale yellow, transparent, soft, somewhat elastic and slightly sticky foils were obtained by drying the latex at about 80° C.

EXAMPLE 9

The same procedure is employed as in Example 3 but using about 40 parts of methyl urea instead of urea and about 64.5 parts by volume of 30 percent aqueous formaldehyde.

An opaque, 30 percent sol is obtained which dries at elevated temperatures to form clear, soft, elastic coatings. The water resistance is improved by previously acidifying the latex and drying at elevated temperature.

EXAMPLE 10

The same procedure is employed as in Example 3 but using about 47 parts of N, N'-dimethylurea instead of urea and about 64.5 parts by volume of aqueous 30 percent formaldehyde.

An opaque, 42 percent sol which dried at about 100° C., to form very soft, very sticky masses is obtained.

EXAMPLE 11

The same procedure is employed as in Example 3 but using about 48 parts of methylthiourea instead of urea and about 64.5 parts by volume of 30 percent aqueous formaldehyde.

An opaque, 41 percent sol which dries at 100° C. to form soft, thermoplastic coatings is obtained.

EXAMPLE 12

Reactants:

500 parts of a polyester of phthalic acid, adipic acid and ethylene glycol (molecular weight 1650) (PEP))
50 parts N-methyldiethanolamine
52 parts urea
194.5 parts 1,6-hexanediisocyanate
25 parts acetic acid
129 parts by volume 30 percent aqueous formaldehyde
1500 parts by volume water

Method

The same as in Example 3, without the use of monochloroacetamide and ethylene glycol monomethylether acetate. About 1,000 parts of the resulting dispersion are diluted with about 1,000 parts of water. The resulting 20 percent suspension is coarsely disperse and sediments within 12 hours. However, it can be redispersed at any time simply by shaking. A polyurethane paste which has a concentration of about 60–70 percent and which can be diluted again with water at any time is obtained by pouring off the supernatant water.

If the paste, acidified to pH 2–3, is painted on a textile support and dried at 80° C., a mat, soft, elastic foil which has good resistance to water is obtained.

EXAMPLE 13

About 1,000 parts (0.6 mol) of an ester of adipic acid, hexane diol and neopentyl glycol is reacted for about one hour at about 130° C. with about 201 parts of 1,6-hexanediisocyanate, and about 107 parts of dimethylaminoethanol are then added at about 80° C. The reaction mixture is kept for another 30 minutes at about 130° C. and a pale, viscous polyurethane lacquer which has an average molecular weight of about 2,200 and which contains terminal amino groups is obtained.

About 218 parts of the above resin are reacted with about 20.6 parts of monochloroacetamide for about 1 hour at about 120° C. and a polyurethane resin which contains quaternary ammonium groups and terminal carbonamide groups is obtained.

About 30 parts by volume of water, followed by about 80 parts by volume of 30 percent aqueous formaldehyde and lastly about 300 parts by volume of water are added to this product at about 100° C. A 42 percent latex which dries to form a soft, elastic foil at about 120° C. after acidification to pH 3, is obtained.

EXAMPLE 14

The same procedure used as in Example 13 for preparing a polyurethane resin which has terminal tertiary amino groups, but using about 151 parts of 1,6-hexanediisocyanate and about 53 parts of dimethylaminoethanol. The resin formed has an average molecular weight of 4,000.

About 200.5 parts of this resin are reacted with about 10.3 parts of monochloroacetamide for about 1 hour at about 120° C. About 10 parts by volume of water, about 40 parts by volume of 30 percent aqueous formaldehyde and about 530 parts by volume of water are added to this at about 100° C. A 28 percent latex which dries to form a soft, elastic foil at about 120° C. is obtained after acidification to pH 3.

Comparative test

For comparison, a polyurethane which has terminal

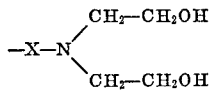

is prepared and is dispersed with an aqueous formalin solution.

To prepare this polyurethane, about 194.5 parts of 1,6-hexamethylenediisocyanate are added to about 500 parts of the polyester mentioned in Example 1 and about 50 parts of N-methyl-diethanolamine at about 68° C. An exothermic reaction sets in immediately, the temperature rising to about 135° C. The reaction mixture is then stirred for a further 20 minutes at this temperature, and the prepolymer is poured with vigorous stirring into about 91.5 parts of diethanolamine. This is then washed down with about 30 parts by volume of ethylene glycol monomethylether, the temperature is kept at about 130° C., about 39.2 parts of monochloroacetamide are added, and the reaction mixture is stirred for a further 30 minutes at about 135° C. The following are then added in succession: about 150 parts by volume H$_2$O over a period of about 50 minutes at about 90° C., about 129 parts by volume of 30 percent aqueous formaldehyde at about 95° C., over a period of about 40 minutes, and about 750 parts by volume water at about 130° C. over a period of about 50 minutes. After cooling, a very thick, colloidal solution is obtained, which is diluted with 1,100 parts by volume of water.

A completely stable, aqueous-colloidal polyurethane solution is obtained. A sample is adjusted to pH 2-3 with tartaric acid, poured on a support and afterheated for about 30 minutes at about 80° C. No foil is obtained. Instead a soft, sticky mass which dissolves in water is obtained. In other words, no polycondensation to form a high molecular weight resin has taken place.

EXAMPLE 15

Reactants 500 parts (0.281 mol) PEP (as in Example 1)
30 parts (0.252 mol) MDA
32 parts (0.534 mol) urea
134.5 parts (0.800 mol) 1,6-hexamethylenediisocyanate
14 parts (0.150 mol) chloroacetamide
6 parts acetic acid
112 parts tartaric acid
64.5 parts by volume of 30 percent aqueous formaldehyde
1050 parts by volume water This procedure is the same as in Example 3. The quantity of tartaric acid indicated above is added to the cold latex, the pH thereby being adjusted to 2-3. The acidified latex is heated to boiling for about 50 minutes for cross-linking to take place. A sample taken after this time is no longer soluble in tetrahydrofuran, but forms a jelly-like mass therein.

After cooling, a highly fluid, very finely divided, 32 percent latex is obtained which dries at room temperature to form nonsticky foils of high tensile strength which have a dull gloss.

EXAMPLE 16

About 500 parts of PEP (see Example 15) are reacted with about 71 parts of 1,6-hexamethylenediisocyanate for about 1 hour at about 130° C. about 18 parts of N-methyldiethanolamine and, 5 minutes later, another 25.5 parts of 1,6-hexamethylenediisocyanate and about 17 parts of urea, are added at about 80° C. The reaction mixture is then stirred at about 130° C. for about 25 minutes, about 5 parts of chloroacetamide in about 10 parts by volume of ethylene glycol monomethylether are added, and the mixture is then stirred for another 15 minutes at about 130° C.

The following are now added in succession:

About 7 parts of glacial acetic acid in about 120 parts by volume of water at about 90° C. in the course of about 10 minutes, about 80 parts by volume of 30 percent aqueous formaldehyde at 90° C. in the course of 6 minutes; about 250 parts by volume of water at about 130° C. in the course of about 15 minutes and about 500 parts by volume of water at about 110° C. in the course of about 25 minutes. The resulting dispersion is adjusted to a pH of 4 with about 20 parts by volume of 30 percent tartaric acid, which results in thickening of the reaction mixture, and the reaction mixture is then stirred for one further hour at about 110° C. until a 10 parts sample forms a jelly-like mass with 50 parts by volume of tetrahydrofuran. A relatively coarse latex is obtained from which a serum separates at the top in the course of time and which then forms a thick paste which has a good consistency for painting purposes. The paste can be easily diluted with water at any time.

A soft, flexible, water resistant and mechanically very strong foil is obtained on drying at about 80° C.

EXAMPLE 17

About 500 parts of a polyester of phthalic acid and ethylene glycol, of OH number 48, about 25.4 parts of N-methyldiethanolamine and about 26 parts of urea are mixed with about 108 parts of 1,6-hexamethylenediisocyanate at about 85° C. The temperature rises to about 122° C. due to the polyaddition reaction which sets in at once. The temperature is then raised to about 130° C. and about 20 parts of chloroacetamide in about 20 parts by volume of ethylene glycol monomethyl ether are added. After stirring for about 30 minutes at 100-120° C., about 130 parts by volume of 30 percent aqueous formaldehyde are added dropwise in the course of about 20 minutes. About 1050 parts by volume of water are stirred into the viscous, almost clear mass in the course of about 50 minutes and a finely divided dispersion is formed. This is adjusted to pH 4 with about 20 parts by volume of 30 percent tartaric acid and then stirred for a further 30 minutes at about 120° C. A sample is soluble in tetrahydrofuran, forming a clear solution. The 37 percent lacquer is eminently suitable for use as a stoving lacquer. It dries at room temperature within a short time to form completely nonsticky, touch-resistant high gloss coatings which are rendered extremely hard, scratch-resistant, firmly adhering and resistant to water and organic solvents by subsequently heating them at about 80° C.

EXAMPLE 18

About 193.5 parts of 1,6-hexanediisocyanate are added at about 70° C. to about 500 parts (0.298 mol) of a polyester of adipic ester, hexane diol and neopentyl glycol, about 50 parts of N-methyldiethanolamine and about 54 parts of urea. The reaction mixture is heated until, between about 120 and about 130° C., an exothermic reaction sets in. The temperature should not be allowed to exceed about 150° C. About 20 parts of monochloroacetamide are then introduced and, after about 30 minutes, first about 12.6 parts of glacial acetic acid in about 150 parts by volume of water and then about 50 parts by volume of 30 percent aqueous formaldehyde solution are added. The reaction mixture is stirred for about 75 minutes at about 100° C. when the smell of formaldehyde will have practically completely disappeared. About 1,200 parts by volume of water are stirred into the clear, viscous solution over a period of about one hour. A very finely divided, opaque, thick liquid latex is formed. This is adjusted to pH 4 with about 20 parts by volume of 30 percent tartaric acid solution, about 30 parts by volume of 30 percent aqueous formaldehyde solution are added, and the reaction mixture is stirred for about 2 hours at about 100° C.

The resulting dispersion yields highly elastic, nonsticky and light stable films.

EXAMPLE 19

185.6 g. of toluylene diisocyanate (isomer mixture 65:345) are added to 500 g. (0.214 mol) of an adipic acid butane diol polyester, 50 g. of N-methyl diethanolamine and 52.3 g. of urea at 75° C. within 2 minutes. The temperature rises to 140° C. within 10 minutes. Into the solution are introduced 19.6 g. of monochloroacetamide and 30 ml of glycol monomethyletheracetate and, after 30 minutes, first 12.6 g. of glacial acetic acid in 150 ml. of water, then 100 ml. of a 30 aqueous formaldehyde solution within 15 minutes. 1500 ml. of water of 90° C. are added dropwise to the turbid viscous solution at 100 to 110° C. within 60 minutes. The yellowish coarse dispersion is subsequently diluted with 1600 ml. of water of 20° C. There is obtained a sedimenting, redispersible dispersion having particles of a diameter between about 0.2 and 0.8 mm. Upon drying the dispersion on porous plates the polyurethane is obtained in form of a powder.

EXAMPLE 20

122 g. of hexamethylene diisocyanate are added at 80° C. to 500 g. (0.284 mol) PEP (see Example 1), 32.2 g. of N-butyl diethanolamine and 20 g. of urea and the mixture is reacted at 130° C. for 60 minutes. At 90° C. successively are added 25 g. of 85% orthophosphoric acid in 50 g. of water within 5 minutes, 500 g. of water within 20 minutes, 60 g. of 30% formalin within 4 minutes and 400 g. of water within 40 minutes. There is obtained a 41% aqueous thickly sol which has a pH-value of 3 and dries at room temperature to yield a soft transparent sheet. By after-heating at 50° C. (60 minutes) or 130° C. (10 minutes) the resistance to water and organic solvents is increased.

EXAMPLE 21

The reaction is carried out as in Example 20, however, after the addition of the first 500 g. of water, a solution of 60 g. of 30% formalin in 600 g. of water is added. A sol of substantially equal properties as that of Example 20 is obtained.

EXAMPLE 22

The process is carried out as in Example 20, however, before dispersion 60 g. of 30% formalin are dissolved in 1100 g. of water and this solution is added within 30 minutes after the addition of the phosphoric acid. A sol of substantially equal properties as that of Example 20 is obtained.

EXAMPLE 23

The reaction is carried out as in Example 20, however, while using 195 ml. of 1 n-hydrochloric acid instead of phosphoric acid. A highly fluid 41% white latex is obtained which is suitable, for example, in the coating of textiles.

EXAMPLE 24

The reaction is carried out as in Example 20, however, while using 12 g. only instead of 25 g. of 85% orthophosphoric acid. A highly fluid white latex is obtained. Solids content: 39.5%. This latex can also be produced by adding a 31% formalin solution immediately after or before the addition of phosphoric acid. After the addition of the two components the total quantity of water is added. Instead of N-butyldiethanolamine the equivalent quantity of N-methyldiethanolamine or N-methyldiisopropanolamine can be added.

EXAMPLE 25

(a) Prepolymer 2000 g. (0.760 mol) of adipic acid diethylene glycol polyester and 254 g. (1.51 mol) of 1,6-hexamethylene diisocyanate are heated to 130° C. for 2 hours.

(b) Dispersion

To 304 g. of the prepolymer there is added at once at 80° C. a solution of 31.6 g. of maleic acid ureide and 14 g. of potassium hydroxide in 144 g. of a 20% taurine-sodium-solution in water (90° C.). 60 ml. of a 30% formalin solution are added within 3 minutes and subsequently 600 ml. of water within 8 minutes. A highly fluid white latex is obtained which is adjusted to pH 4 by the addtiion of 30 ml. of a 30% tartaric acid solution. Upon drying the latex and heating at 130° C. soft elastic solvent-resistant films are obtained.

EXAMPLE 26

250 g. (0.162 mol) of phthalic acid ethylene glycol polyester and 12.7 g. (0.107 mol) of N-methyldiethanolamine are reacted at 130° C. for 30 minutes with 110 g. (0.635 mol) of 1,6-hexamethylene diisocyanate (NCO/OH-ratio 2.44). The mixture is then stirred at 130° C. for another 30 minutes with 33 g. of urea (NCO/urea-ratio 1.4). Quaternization is effected with 10 g. of chloroacetamide at 130° C. within 30 minutes. The mixture is allowed to cool to 110° C., a 100 ml. of a 30% aqueous formalin solution is added; this is followed by stirring at 110° C. for another 30 minutes and 500 ml. of water of 90° C. are then added. The resulting highly fluid, relatively coarsely dispersed latex is acidified with 10 ml. of a 30% tartaric acid solution, cooled down and mixed with 30 g. of hexamethylene melamin pentamethylether.

The latex dries at room temperature to yield glossy coatings which, upon stoving at 120 to 150° C., are finally reacted to yield products of high surface hardness.

EXAMPLES 27–38

The reactions are carried out analoguous to Example 3 with the following components.

① Sample in tetrahydrofurane, clearly soluble
② Sample in tetrahydrofurane, turbid and highly viscous
PEP: adipic acid-phthalic acid-ethylene glycol polyester (1:1:2,2)

AD: adipic acid-diethylene glycol polyester
AEB: adipic acid-ethylene glycol-butane diol polyester (2:1,2:1)
TEG: tetraethylene glycol
AEP: adipic acid-ethylene glycol-propane dio-1,2-polyester
SP: acidpolyester with terminal carboxylic groups from adipic acid-phthalic acid-hexane diol
CAA: chloroacetamid
DCD: dichlorodurol (1,3-bis-chloromethyl-4,6-dimethylbenzene)
MCM: methylchloromethylether
BB: 1-brombutane
E: acetic acid
M: lactic acid
A: formic acid

| Example | Polyester, g.(mol) | MDA, g. | Urea, g. | 1,6-hexane diisocyanate, g. | Grams alkylation agents | H₃PO₄ (85%), g. | pH | Latex | Formaldehyde 30% g. | Water, g. | Tartaric acid 30% ml. | Stirring after | Latex properties |
|---|---|---|---|---|---|---|---|---|---|---|---|---|---|
| 27 | PEP, 1,000 (0.568) | 40 | 56 | 228 | 16 CAA, 8 DCD | 20 | 4 | ----- | 160 | 1,400 | 40 | 50 minutes, 110° | 40.5% white, highly fluid. |
| 28 | AD, 1,000 (0.380) | 40 | 44 | 180 | 16 CAA | | | | 160 | 1,200 | 60 | 2 stdn. 90° | 39.4% white, highly fluid. |
| 29 | PEP, 1,000 (0.568) | 40 | 56 | 228 | 16 CAA | | | | 160 | 1,200 | 1 24 | 4 hours, 100° | 42.8% white, ⊕ highly fluid. |
| 30 | PEP, 1,000 (0.568) | 40 | 56 | 228 | 16 CAA | | | | 160 | 1,200 | 1 24 | 2 hours, 100° | 43.3% white, ⊕ highly fluid. |
| 31 | AEB, 500 (0.284) | 20 | 25 | 101 | 8 CAA | | | | 80 | 900 | 20 | 2 hours, 100° | 36.9% white, highly viscous. |
| 32 | TEG, 202 (1.04) | 119 | 120 | 504 | ¹ 16 | | | | 80 | 850 | | 1 hour, 120° | 52% thick transparent sol, white by 80%. |
| 33 | AEP, 1,000 (0.646) | 40 | 60 | 248 | 16 CAA | 16 | 4-5 | ----- | 160 | 1,400 | 40 | | 43% white, highly fluid. |
| 34 | SP, 500 (0.230) | 22 | 30 | 92 | 10 CAA | | | | 80 | 1,000 | 30 | | 34% white, above 35° liquid, below solid. |
| 35 | PEP, 500 (0.284) | 22 | 22.5 | 110 | 16 MCM | 12 | 6 | ----- | 50 | 750 | 30 | 1 hour, 95° | 39% white, very highly viscous. |
| 36 | PEP, 500 (0.284) | 22 | 22.5 | 110 | 8.6 MCM | | | | 50 | 850 | 30 | | 37% white paste. |
| 37 | PEP, 500 (0.284) | 22 | 22.5 | 110 | | | | | 50 | 1,030 | 30 | | 34% white. |
| 38 | PEP, 500 (0.284) | 22 | 22.5 | 110 | 15 BB | | | | 50 | 600 | 30 | | 45% white, highly fluid fusible. |

¹ Grams maleic acid.

EXAMPLE 39

250 g. (0.094 mol) of an adipic acid-phthalic acid-ethylene glycol polyester (molecular ratio 2:1:3,3), 30 g. of 2-dimethyl aminoethanol and 17 g. urea are reacted at 130° for 60 minutes with 71 g. of 1,6-hexamethylene diisocyanate, 30 g. of 85% phosphoric acid, 30 g. of a 30% formaldehyde solution and 450 g. of H₂O are successively added at 90° C. The highly fluid polyurethane is not dispersed. By acidifying with additional phosphoric acid to pH 3 there is obtained a very thick, finely dispersed latex which can be used as an adhesive.

EXAMPLE 40

The reaction is carried out analogously to Example 20, however, the formalin solution is added as the last component after the addition of water. There is obtained a highly fluid 42% sol which, upon drying, yields films with substantially equal properties as those of Example 20.

EXAMPLES 41-43

The reactions are carried out as in Example 40, however, with varied quantities of phosphoric acid:

| Example | H₃PO₄ (85%), g. | pH | Latex | Ford-Becker viscous (nozzle) |
|---|---|---|---|---|
| 41 | 20 | 4 | ----- | 40″ (6 |
| 42 | 16 | 4-5 | ----- | 6.6″ (8) |
| 43 | 12 | 6 | ----- | 4.8″ 9) |

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. An aqueous dispersion of a polyurethane polyelectrolyte which
   (a) has an average molecular weight of less than 25,000,
   (b) contains hydrophobic, non-ionic chain segments,
   (c) contains 4 to 120 milliequivalents per 100 grams of salt groups selected from the group consisting of $$-\overset{\oplus}{\underset{|}{S}}-, \quad -\overset{\oplus}{\underset{|}{N}}-, \quad -\overset{\oplus}{\underset{|}{P}}-, \quad -COO^\ominus, \quad -SO_3^\ominus, \quad -O-SO_3^\ominus, \quad -SO_2^\ominus,$$

wherein R'=alkyl, cycloalkyl, aralkyl, aryl or corresponding groups which are capable of forming such salt groups and which are subsequently converted into salt groups in the course of the process,
   (d) has a viscosity of 50 to 1,500 poises at 120° C.,
   (e) contains terminal groups of the formula $$-X-\underset{\underset{R}{|}}{N}-CH_2OH$$

in which formula:
X represents

-CO-, -CS-, -SO₂-, -NR-CO-, -NR-CS-,
-SO₂-, -CNR, -CO-NR-CO-, -CS-NR-CS-,

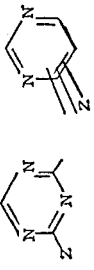

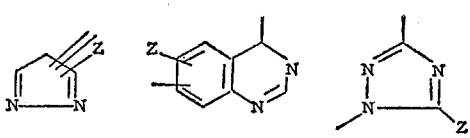

Z represents

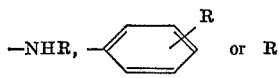

R represents:
a hydrogen atom or
an alkyl radical with 1 to 4 carbon atoms, which may be substituted by OH, OCH$_3$, OC$_2$H$_5$, CCl$_3$, COOH or SO$_3$H or
an alkenyl radical with 1 to 4 carbon atoms which may be substituted by OH, OCH$_3$, OC$_2$H$_5$, CCl$_3$, COOH or SO$_2$H,
which alkyl or alkenyly radical may also be part of a heterocyclic 5-membered or 6-membered ring having 1 to 3 hetero atoms selected from the group consisting of nitrogen, oxygen and sulphur which heterocyclic rings are selected from those in which no hetero atom is directly linked with another hetero atom or R represents CN, CO—R″, SO$_2$R″ in which R″ may represent an alkyl, alkenyl, alkoxy or carbalkoxy radical having to 4 carbon atoms, and (f) the total quantity of water is 0.5 to 4 times the quantity of said polyurethane electrolyte.

2. A process for the production of high molecular weight polyurethanes which comprises heating the dispersion of claim 1 at 25 to 200° C. and removing the water.

3. The process of claim 2 wherein said heating is in the range of 70 to 150° C.

4. The dispersion of claim 1 wherein the polyurethane polyelectrolyte is prepared by reacting formaldehyde with a prepolymer containing terminal groups of the formula

5. The dispersion of claim 4 wherein said formaldehyde is reacted with said prepolymer in an aqueous solution at pH values between 9 and 4.1.

6. The process of claim 2 wherein the heat treatment is conducted before the water is removed.

7. The process of claim 2 wherein the heat treatment is conducted while the water is removed.

8. The process if claim 2 wherein the heat treatment is conducted after the water is removed.

9. The process of claim 2 wherein the heat treatment is conducted before, during and after the water is removed.

10. The dispersion of claim 1 wherein the polyurethane polyelectrolyte has been prepared from an organic diisocyanate and compounds containing reactive hydrogen atoms having a molecular weight of 50–8000, said polyurethane polyelectrolyte having a molecular weight of 2000 to 10,000, containing 8 to 80 milliequivalents per 100 grams of salt groups or groups capable of salt formation and subsequently converted into salt groups, having a viscosity from 100 to 1000 poises, said polyurethane polyelectrolyte being dispersed by mixing with water at 50 to 130° C.

11. The dispersion of claim 1 wherein the group —X—NR—CH$_2$OH is an —NH—CO—NH—CH$_2$CH group.

12. The dispersion of claim 1 wherein the polyurethane polyelectrolyte is prepared using polar group forming or polar group containing chain-lengthening agents.

13. The dispersion of claim 1 wherein the polyurethane polyelectrolyte is prepared using polar group forming or polar group containing organic compounnds bearing an OH— or —NH— group and a —NH—CO—NH$_2$ group.

14. The dispersion of claim 1 wherein the polyurethane polyelectrolyte is prepared by addition of polar group forming or polar group containing moniisocyanates containing tertiary amino, sulfide or reactive halogen groups to non-ionic polyurethanes.

15. The dispersion of claim 1 wherein the polyurethane polyelectrolyte is prepared by addition of compounds bearing polar group forming or polar group containing agents and at least one —OH, —SH—, —NH—, or SCl-group to non-ionic polyurethanes bearing reactive unsaturated double bonds in the chain.

16. Process of claim 2 characterized in that the polyurethane dispersion is adjusted to a pH-value between 4.2 and 2 prior to or during the heat treatment.

References Cited
UNITED STATES PATENTS 3,384,606   5/1968   Dieterich et al. _____ 260—841
3,087,912   4/1963   Wagner et al. _____ 260—841

DONALD E. CZAJA, Primary Examiner

M. J. WELSH, Assistant Examiner

U.S. Cl. X.R.

117—123 D, 124 E, 126 132 C, 138.8, 142, 148, 155 R; 156—331; 260—2.5 AM, 37 N, 29.2 TN, 77.5 AM, 858